(12) United States Patent
Tazawa et al.

(10) Patent No.: US 9,372,311 B2
(45) Date of Patent: Jun. 21, 2016

(54) WAVELENGTH SELECTIVE SWITCH

(71) Applicant: Sumitomo Electric Industries, Ltd., Osaka-shi (JP)

(72) Inventors: Hidehisa Tazawa, Yokohama (JP); Kenichiro Takahashi, Yokohama (JP); Manabu Shiozaki, Yokohama (JP); Takafumi Ohtsuka, Yokohama (JP); Masaki Suzuki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 100 days.

(21) Appl. No.: 14/488,817

(22) Filed: Sep. 17, 2014

(65) Prior Publication Data
US 2015/0078748 A1 Mar. 19, 2015

(30) Foreign Application Priority Data

Sep. 18, 2013 (JP) .................................. 2013-193216
Apr. 16, 2014 (JP) .................................. 2014-084346

(51) Int. Cl.
*G02B 6/293* (2006.01)
*G02B 6/35* (2006.01)
*H04Q 11/00* (2006.01)

(52) U.S. Cl.
CPC .......... *G02B 6/29311* (2013.01); *G02B 6/2931* (2013.01); *G02B 6/356* (2013.01); *H04Q 2011/0026* (2013.01)

(58) Field of Classification Search
None
See application file for complete search history.

(56) References Cited

U.S. PATENT DOCUMENTS

| 7,019,883 | B2 | 3/2006 | Moon et al. | |
|---|---|---|---|---|
| 7,397,980 | B2 | 7/2008 | Frisken | |
| 7,787,720 | B2 | 8/2010 | Frisken et al. | |
| 2002/0176149 | A1 | 11/2002 | Davis et al. | |
| 2006/0067611 | A1* | 3/2006 | Frisken | G02B 6/272 385/16 |
| 2008/0298738 | A1* | 12/2008 | Ishikawa | G02B 6/12011 385/3 |
| 2013/0038917 | A1* | 2/2013 | Watanabe | G02B 6/356 359/225.1 |
| 2014/0072302 | A1* | 3/2014 | Iwama | H04Q 11/0005 398/48 |
| 2014/0321796 | A1* | 10/2014 | Ohtsuka | G02F 1/31 385/3 |

FOREIGN PATENT DOCUMENTS

JP 2013-152414 8/2013

* cited by examiner

*Primary Examiner* — David Payne
*Assistant Examiner* — Casey Kretzer
(74) *Attorney, Agent, or Firm* — Venable LLP; Michael A. Sartori

(57) ABSTRACT

A wavelength selective switch includes a wavelength dispersive element that divides a beam input from an input port, a beam director that deflects a wavelength component, and a free space optical system that optically couple a input/output unit, the wavelength dispersive element, and the beam director. The free space optical system converts a shape of the beam such that a size extending in a second plane is relatively smaller than a size extending in a first plane, and to have a long axis and a short axis in a third plane. The long axis is inclined with respect to the first direction. The beam director includes a beam directing region in which a plurality of beam directing elements are arranged. The beam directing region deflects the respective wavelength components toward the predetermined output port. The beam directing region is provided to correspond to the shape of the beam.

20 Claims, 17 Drawing Sheets

WAVELENGTH SELECTIVE SWITCH

BACKGROUND OF THE INVENTION

1. Field of the Invention

An aspect of the present invention relates to a wavelength selective switch.

2. Related Background Art

In recent years, a ROADM (Reconfigurable Optical Add-Drop Multiplexer) that is a light inserting and branching device in a wavelength multiplexed network has been developed according to increases in speed and capacity of communication networks. In this ROADM, a wavelength selective switch (WSS) has been developed as a device for branching or combining light. A WSS that independently controls an optical path for each wavelength component through phase modulation is disclosed in the specification of U.S. Pat. No. 7,787,720.

A WSS is described in the specification of U.S. Pat. No. 7,397,980. In this WSS, an optical signal input from an input port is spatially separated into first and second groups. The optical signals in the first and second groups are separated into wavelength components in a diffraction grating. Also, the wavelength components included in the first and second groups are incident on different areas of an LCOS SLM (Liquid Crystal On Silicon Spatial light Modulator) and deflected.

SUMMARY OF THE INVENTION

In order to accurately control an optical path using a phase modulation element, it is necessary to elongate a shape of a beam in a phase modulation direction and to increase the number of pixels of the phase modulation element in that direction. In this case, it is preferable to use a phase modulation element having a large number of pixels, but a size of the phase modulation element may increase and a wavelength selective switch becomes large.

Further, a beam shape may be changed into an ellipse and then the beam may be incident on a diffraction grating. In this case, when an optical axis of the beam is inclined with respect to a normal of the diffraction grating, a beam shape in the phase modulation element may be inclined with respect to a direction in which pixels of the phase modulation element are arranged. In this case, a portion in which a pixel is not assigned to the beam is produced, and a bandwidth of an output optical signal may be limited.

A wavelength selective switch according to an aspect of the present invention includes: an input/output unit including an input port for inputting a beam and an output port for outputting the beam arranged in a first direction; a wavelength dispersive element dispersing the beam input from the input port into wavelength components along a second direction intersecting the first direction; a beam director deflecting the wavelength component in the first direction to direct the wavelength component to the predetermined output port; and a free space optical system optically coupling the input/output unit, the wavelength dispersive element, and the beam director on a predetermined axis along a third direction intersecting the first direction and the second direction, wherein the free space optical system converts a shape of the beam incident on the beam director such that a size extending in a second plane including the second direction and the third direction is relatively smaller than a size extending in a first plane including the first direction and the third direction, and to have a long axis and a short axis in a third plane extending in the first direction and the second direction, the long axis is inclined with respect to the first direction, the beam director includes a plurality of beam directing elements arranged in the third plane; and a beam directing region in which the plurality of beam directing elements arranged in the first direction are arranged in a predetermined number in the second direction, the beam directing region deflects the respective wavelength components toward the predetermined output port by independently phase-modulating the respective wavelength components, and the beam directing region is provided to correspond to the shape of the beam.

A wavelength selective switch according to an aspect of the present invention includes: an input/output unit including an input port for inputting a beam and an output port for outputting the beam are arranged in a first direction; a wavelength dispersive element dispersing the beam input from the input port into wavelength components along a second direction intersecting the first direction; a beam director deflecting the wavelength component in the first direction to direct the wavelength component to the predetermined output port; and a free space optical system optically coupling the input/output unit, the wavelength dispersive element, and the beam director on a predetermined axis along a third direction intersecting the first direction and the second direction, wherein the free space optical system converts a shape of the beam incident on the beam director such that a size extending in a second plane including the second direction and the third direction is relatively smaller than a size extending in a first plane including the first direction and the third direction, and to have a long axis and a short axis in a third plane extending in the first direction and the second direction, and the long axis is inclined with respect to the first direction.

DETAILED DESCRIPTION OF THE EMBODIMENTS

Description of Embodiments

Figure 1:
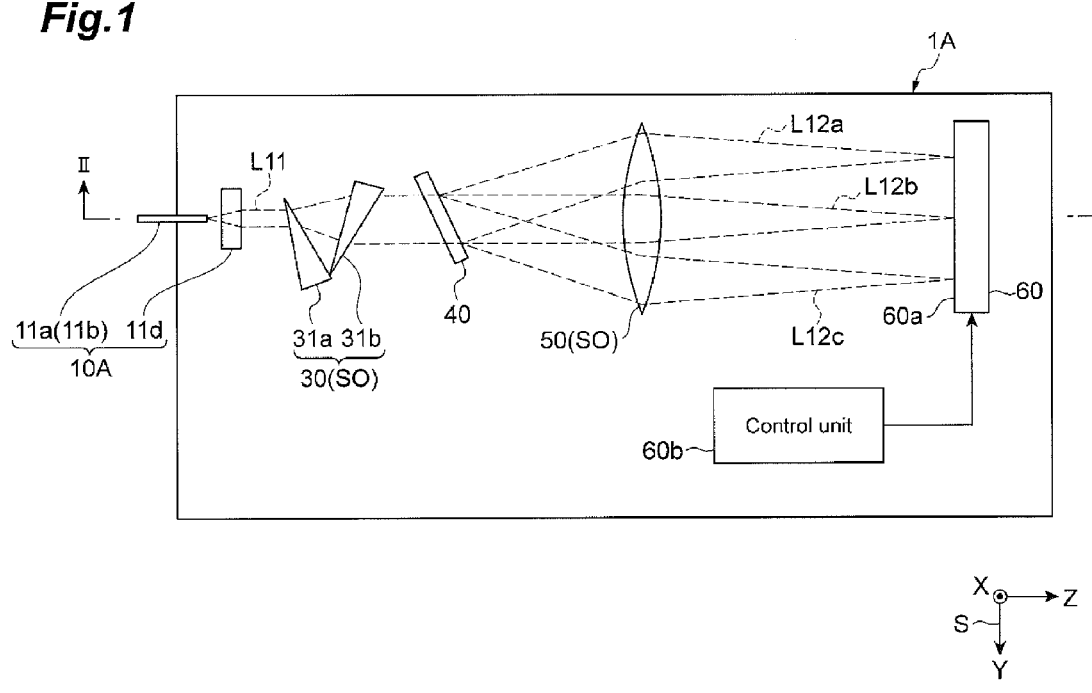
FIG. 1 is a plan view schematically illustrating a configuration of a wavelength selective switch as a first embodiment of one aspect of the present invention.

First, one embodiment of a wavelength selective switch according to one aspect of the present invention will be listed for explanation.

A wavelength selective switch according to an embodiment includes an input/output unit including an input port for inputting a beam and an output port for outputting the beam are arranged in a first direction; a wavelength dispersive element dispersing the beam input from the input port into wavelength components along a second direction intersecting the first direction; a beam director deflecting the wavelength component in the first direction to direct the wavelength component to the predetermined output port; and a free space optical system optically coupling the input/output unit, the wavelength dispersive element, and the beam director on a predetermined axis along a third direction intersecting the first direction and the second direction, the free space optical system converting a shape of the beam incident on the beam director such that a size extending in a second plane including the second direction and the third direction is relatively smaller than a size extending in a first plane including the first direction and the third direction, and to have a long axis and a short axis in a third plane extending in the first direction and the second direction, the long axis being inclined with respect to the first direction, and the beam director including a plurality of beam directing elements arranged in the third plane; and a beam directing region in which the plurality of beam directing elements arranged in the first direction are arranged in a predetermined number in the second direction, the beam directing region deflects the respective wavelength components toward the predetermined output port by independently phase-modulating the respective wavelength components, and the beam directing region is provided to correspond to the shape of the beam.

In the wavelength selective switch according to an embodiment, the beam directing region may be configured such that the plurality of beam directing elements arranged in the first direction forming a predetermined phase modulation pattern being plurally arranged in the second direction, and the beam directing region may be provided to correspond to the shape of the beam by shifting the beam directing elements forming the predetermined phase modulation pattern in the second direction.

In the wavelength selective switch according to an embodiment, in the beam directing region, phase modulation amounts of the beam directing elements adjacent in the second direction may be substantially equal.

In the wavelength selective switch according to an embodiment, the long axis may include a first long axis and a second long axis that are inclined at different angles with respect to the first direction.

In the wavelength selective switch according to an embodiment, the first long axis and the second long axis may be inclined toward the same sides in the second direction with respect to the first direction.

In the wavelength selective switch according to an embodiment, a shape of the beam incident on the beam director may include a distortion portion, and the distortion portion may protrude outward from ends of the short axis extending in the first direction.

In the wavelength selective switch according to an embodiment, an optical axis of the beam incident on the wavelength dispersive element may be inclined with respect to a normal of the wavelength dispersive element in the first plane.

In the wavelength selective switch according to an embodiment, the input/output unit may be configured to input or output a first beam having a first optical axis and a second beam having a second optical axis, the first optical axis and the second optical axis may be inclined in the first direction at different angles with respect to the third direction, the wavelength dispersive element may be provided in common between the first beam and the second beam, the beam director may include a first beam directing unit and a second beam directing unit, the first beam directing unit may include the plurality of beam directing regions and deflect the first beam toward the output port, and the second beam directing unit may include the plurality of beam directing regions and deflect the second beam toward the output port.

In the wavelength selective switch according to an embodiment, the input/output unit may include a first input/output port including a first input port for inputting the first beam and a first output port for outputting the first beam; and a second input/output port including a second input port for inputting the second beam and a second output port for outputting the second beam, the first beam directing unit may deflect the first beam toward the first output port, and the second beam directing unit may deflect the second beam toward the second output port.

In the wavelength selective switch according to an embodiment, the input/output unit may include a polarization diversity element that receives the beam input from the input port, separates the beam into the first beam and the second beam that are different polarization components, and emits the first beam and the second beam.

In the wavelength selective switch according to an embodiment, the first beam directing unit and the second beam directing unit may deflect the first beam and the second beam that are the same wavelength components and different polarization components toward a common output port.

In the wavelength selective switch according to an embodiment, a positive or negative sign of the angle of inclination with respect to a normal of the wavelength dispersive element of the first optical axis and a positive or negative sign of the angle of inclination with respect to the normal of the wavelength dispersive element of the second optical axis may differ from each other.

In the wavelength selective switch according to an embodiment, an absolute value of the angle of inclination with respect to the normal of the first optical axis and an absolute value of the angle of inclination with respect to the normal of the second optical axis may be substantially equal.

In the wavelength selective switch according to an embodiment, the free space optical system may include an anamorphic system converting a shape of the beam input from the input port; and a condensing element condensing the wavelength component on the beam director, the anamorphic system may convert the shape of the beam so that a size extending in the second plane is relatively greater than a size extending in the first plane, and the condensing element may convert the shape of the beam incident on the beam director so that the size extending in the second plane is relatively smaller than the size extending in the first plane.

In the wavelength selective switch according to an embodiment, an absolute value of the angle of inclination of the long axis may be greater than 0° and equal to or less than 5°.

In the wavelength selective switch according to an embodiment, an absolute value of the angle of inclination with respect to a normal of the wavelength dispersive element of the optical axis of the beam incident on the wavelength dispersive element may be greater than 0° and equal to or less than 5°.

In the wavelength selective switch according to an embodiment, an aspect ratio of the beam incident on the wavelength dispersive element, in the third plane, may be equal to or greater than 10.

The wavelength selective switch according to an embodiment, the aspect ratio may be equal to or greater than 40.

The wavelength selective switch according to an embodiment may further include a first optical system matching a beam waist position of the beam incident on the wavelength dispersive element in the first plane to a position of the wavelength dispersive element in the third direction; and a second optical system shifting a beam waist position of the beam incident on the wavelength dispersive element in the second plane from the position of the wavelength dispersive element in the third direction.

A wavelength selective switch according to an embodiment includes an input/output unit including an input port for inputting a beam and an output port for outputting the beam arranged in a first direction; a wavelength dispersive element dispersing the beam input from the input port into wavelength components along a second direction intersecting the first direction; a beam director deflecting the wavelength component in the first direction to direct the wavelength component to the predetermined output port; and a free space optical system optically coupling the input/output unit, the wavelength dispersive element, and the beam director on a predetermined axis along a third direction intersecting the first direction and the second direction, wherein the free space optical system converts a shape of the beam incident on the beam director such that a size extending in a second plane including the second direction and the third direction is relatively smaller than a size extending in a first plane including the first direction and the third direction, and to have a long axis and a short axis in a third plane extending in the first direction and the second direction, the long axis being inclined with respect to the first direction.

In the wavelength selective switch according to an embodiment, the long axis may include a first long axis and a second long axis inclined at different angles with respect to the first direction.

Details of Embodiments

Hereinafter, preferred embodiments of the present invention will be described with reference to the accompanying drawing. Further, the same elements are denoted with the same reference signs in description of the drawings and repeated description is omitted. One aspect of the present invention is not limited to the following illustrations. Each claim shows one aspect of the present invention, and all changes equivalent in meaning and range to the claims are included.

First Embodiment

Figure 2:
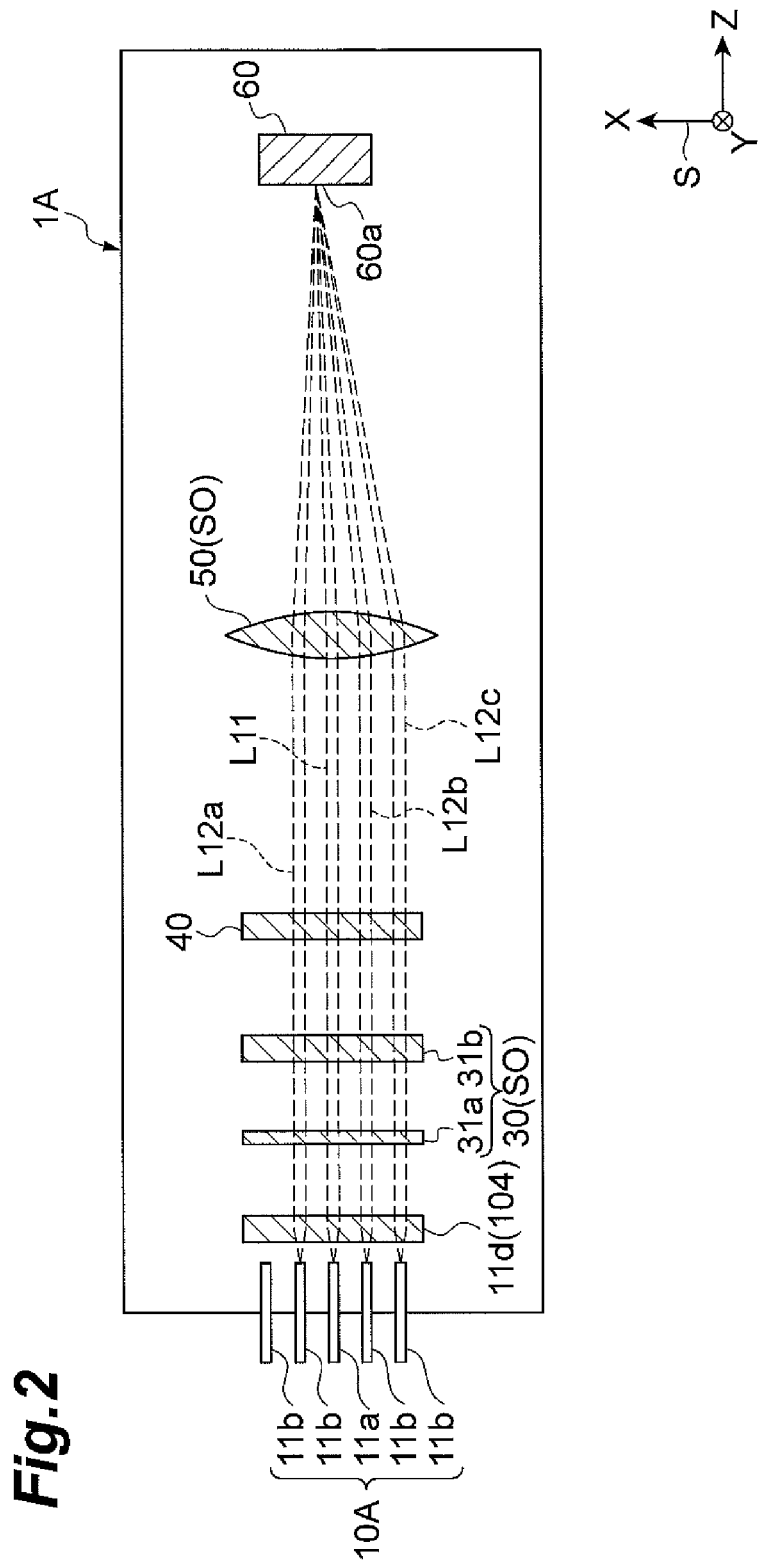
FIG. 2 is a side cross-sectional view taken along a line II-II of the wavelength selective switch illustrated in FIG. 1.

FIGS. 1 and 2 illustrate a configuration of a wavelength selective switch 1A as a first embodiment of the present invention. An XYZ Cartesian coordinate system S is illustrated in FIGS. 1 and 2. FIG. 1 is a diagram illustrating the wavelength selective switch 1A viewed in an X direction and is a diagram illustrating a configuration of the wavelength selective switch 1A in a YZ plane (second plane). FIG. 2 is a diagram illustrating the wavelength selective switch 1A viewed in a Y direction and is a diagram illustrating a configuration of the wavelength selective switch 1A in an XZ plane (first plane).

The wavelength selective switch 1A includes an input/output unit 10A, a free space optical system SO, a diffraction grating (wavelength dispersive element) 40, and a beam director 60. The free space optical system SO includes an anamorphic system 30, and a condensing element 50. The free space optical system SO optically couple the input/output unit 10A, the wavelength dispersive element 40, and the beam director 60 on a predetermined axis C along a Z direction. In the present embodiment, the Z axis is a direction corresponding to a propagation direction of a beam input from the input/output unit 10A, and the Z direction is hereinafter referred to as an optical axis direction. While the optical axis direction is drawn in one direction in FIGS. 1 and 2, the optical axis direction may be bent by arranging of a reflecting mirror for example. The wavelength selective switch 1A further includes a control unit 60b that controls the beam director 60.

The input/output unit 10A includes an input port 11a, a plurality of output ports 11b, and a collimator lens 11d. The input port 11a and the output port 11b are arranged along the X-axis direction (a first direction). The input port 11a and the output port 11b include, for example, an optical waveguide member such as an optical fiber. A wavelength multiplexed signal L11 containing a plurality of wavelength components is input from the input port 11a. Each wavelength component is optionally selected and output from any one of the output ports 11b. Wavelength components L12a to L12c are illustrated in FIGS. 1 and 2. Since an optical path of each of the wavelength components L12a to 12c is changed to the X direction, the X direction in which the output ports 11b are arranged is defined as a switching direction.

The collimator lens 11d is optically coupled to the input port 11a and the output port 11b. The collimator lens 11d collimates the beam L11 input from the input port 11a. Further, the collimator lens 11d condenses the respective beams L12a to 12c toward the corresponding output ports 11b.

The anamorphic system 30 converts a shape of the beam L11 into an ellipse having a long axis in the Y direction (a second direction) perpendicular to the X direction and the Z direction. The anamorphic system 30 includes, for example, prisms 31a and 31b.

The anamorphic system 30 may convert the shape of the beam into an elliptical shape that is flat in the Y direction. The anamorphic system 30 may be configured to expand the beam in the Y direction or may reduce the beam in the X direction. Such an anamorphic system 30 may be the optical system including the pair of prisms, but may include one or a combination of a plurality of optical component having optical power in the X direction or the Y direction (for example, a cylindrical lens or a cylindrical mirror).

The diffraction grating 40 is a wavelength dispersive element that disperses the wavelength multiplexed signal L11 to the respective wavelength components L12a to 12c. The wavelength dispersive element is, for example, a plate-shaped member having a diffraction grating formed on a surface thereof. The respective wavelength components L12a to L12c propagate to different directions in the Y direction according to their wavelengths. The Y direction is defined as a dispersion direction.

The condensing element 50 optically couples the wavelength dispersive element 40 and the beam director 60. The condensing element 50 is, for example, a condensing lens or a concave mirror. The condensing element 50 condenses the respective wavelength components L12a to 12c on a modulation surface 60a of the beam director 60. When the beam L11 is expanded at predetermined magnification in the Y direction in the anamorphic system 30, the beam is reduced at the magnification in the Y direction in the condensing element 50. Further, when the beam L11 is reduced at predetermined magnification in the X direction in the anamorphic system 30, the beam is expanded at the magnification in the X direction in the condensing element 50. Accordingly, in the beam director 60, a beam having a long axis in the X direction is formed.

Figure 3:
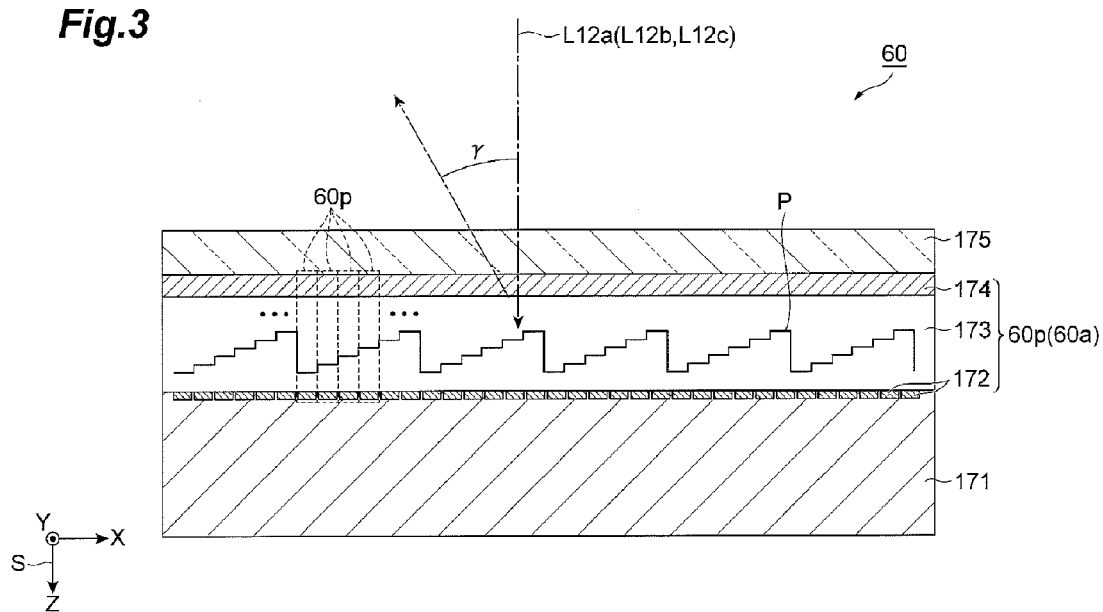
FIG. 3 is a cross-sectional view illustrating a configuration of an LCOS as an example of a specific configuration of a phase modulation element.

The beam director 60 includes a plurality of beam directing elements 60p arranged two-dimensionally in an XY plane (third plane). The wavelength components L12a to 12c are incident on different regions in the Y direction in the beam director 60, as illustrated in FIG. 1. Also, the wavelength components L12a to L12c are independently subjected to phase modulation in each region by the plurality of beam directing elements 60p arranged in the X direction, as illustrated in FIG. 3. The beam director 60 deflects the optical paths of the beams L12a to 12c in the X direction by presenting a diffraction-grating-shaped phase modulation pattern P in a switching direction (X direction: first direction). A deflection angle is set so that the respective beams L12a to 12c are incident on the desired output ports 11b.

A configuration of an LCOS that is the beam director 60 in the present embodiment is illustrated with reference to FIG. 3. The beam director 60 includes a silicon substrate 171, and a plurality of pixel electrodes 172 provided on a main surface of the silicon substrate 171. The pixel electrodes 172 are two-dimensionally arranged in an XY plane. A liquid crystal layer 173, a transparent electrode 174, and a cover glass 175 are sequentially arranged on the silicon substrate 171. Phases of the wavelength components L12a to 12c incident on the liquid crystal layer 173 are modulated according to amounts of electric fields formed between the transparent electrode 174 and the plurality of pixel electrodes 172. Electric fields having different amounts are formed in the pixel electrodes 172, such that a different amount of phase modulation can be assigned to each pixel. That is, the pixel electrodes 172, the liquid crystal layer 173, and the transparent electrode 174 function as the beam directing element 60p. A size (a length of one side in the X direction and the Y direction) of the beam directing element 60p is, for example, equal to or smaller than 20 μm.

The modulation surface 60a includes a plurality of beam directing elements 60p. A graph P conceptually shows an amount of phase modulation of each pixel when the diffraction-grating-shaped phase modulation pattern is presented on the modulation surface 60a. The control unit 60b controls a voltage that is applied to each pixel electrode 172 so as to present this phase modulation pattern. Also, the control unit 60b controls a deflection angle γ of the beam deflected by the beam director 60.

Figure 4:
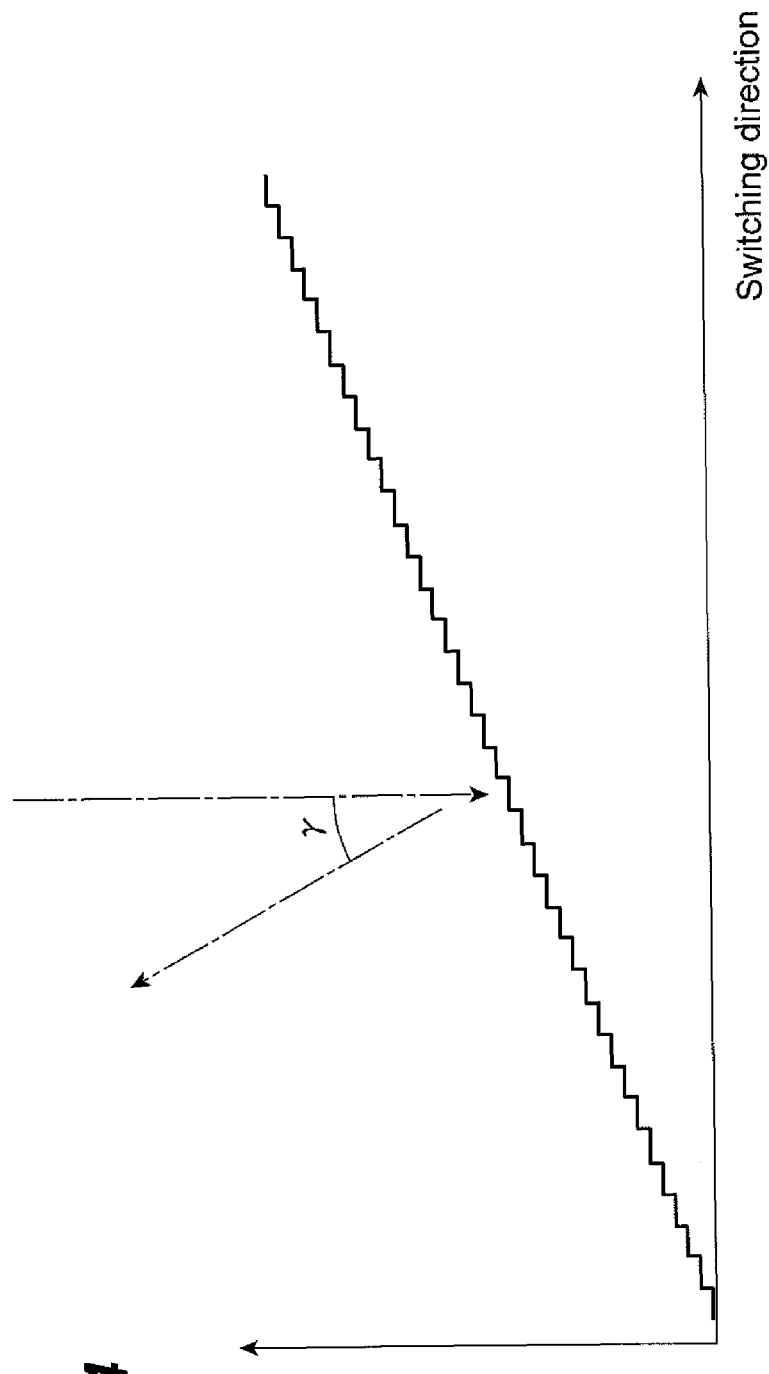
FIG. 4 is a graph illustrating substantial phase change in a switching direction when a diffraction-grating-shaped phase modulation pattern is presented on a modulation surface.

FIG. 4 is a graph illustrating substantial phase change in the switching direction when the diffraction-grating-shaped phase modulation pattern is presented on the modulation surface 60a. In the modulation surface 60a, the phase modulation amount gradually increases to $2\pi$ ($rad$) from 0 (rad), and returns to 0 (rad) upon reaching $2\pi$ ($rad$), as illustrated in FIG. 3. Accordingly, the diffraction-grating-shaped phase modulation pattern increasing monotonically in a step form illustrated in FIG. 4 is substantially realized. Also, the beams L12a to 12c are deflected at a deflection angle γ according to the phase modulation pattern.

The control unit 60b electrically controls a beam directing region to correspond to the shape of the beam incident on the modulation surface 60a. The plurality of pixel electrodes 172 are electrically addressable by the control unit 60b through the silicon substrate 171. Accordingly, the voltages to be applied to the plurality of pixel electrodes 172 can be independently set, and different phase modulation amounts can be assigned to the respective beam directing elements 60p.

A shape of the beam incident on the beam director 60 will be described in detail. A beam used in the present embodiment is a Gaussian beam, and distribution of optical intensity with respect to a distance from a beam center is Gaussian distribution. A diameter of the Gaussian beam is generally defined by an outer edge in which the intensity of the beam becomes $1/e^2$ (13.5%) of a peak value. Therefore, the beam width is assumed to be such an actual width in description of the present embodiment. Further, a shade of a color of the beam directing element 60p in FIG. 5 indicates a depth of the phase modulation amount.

Figure 5:
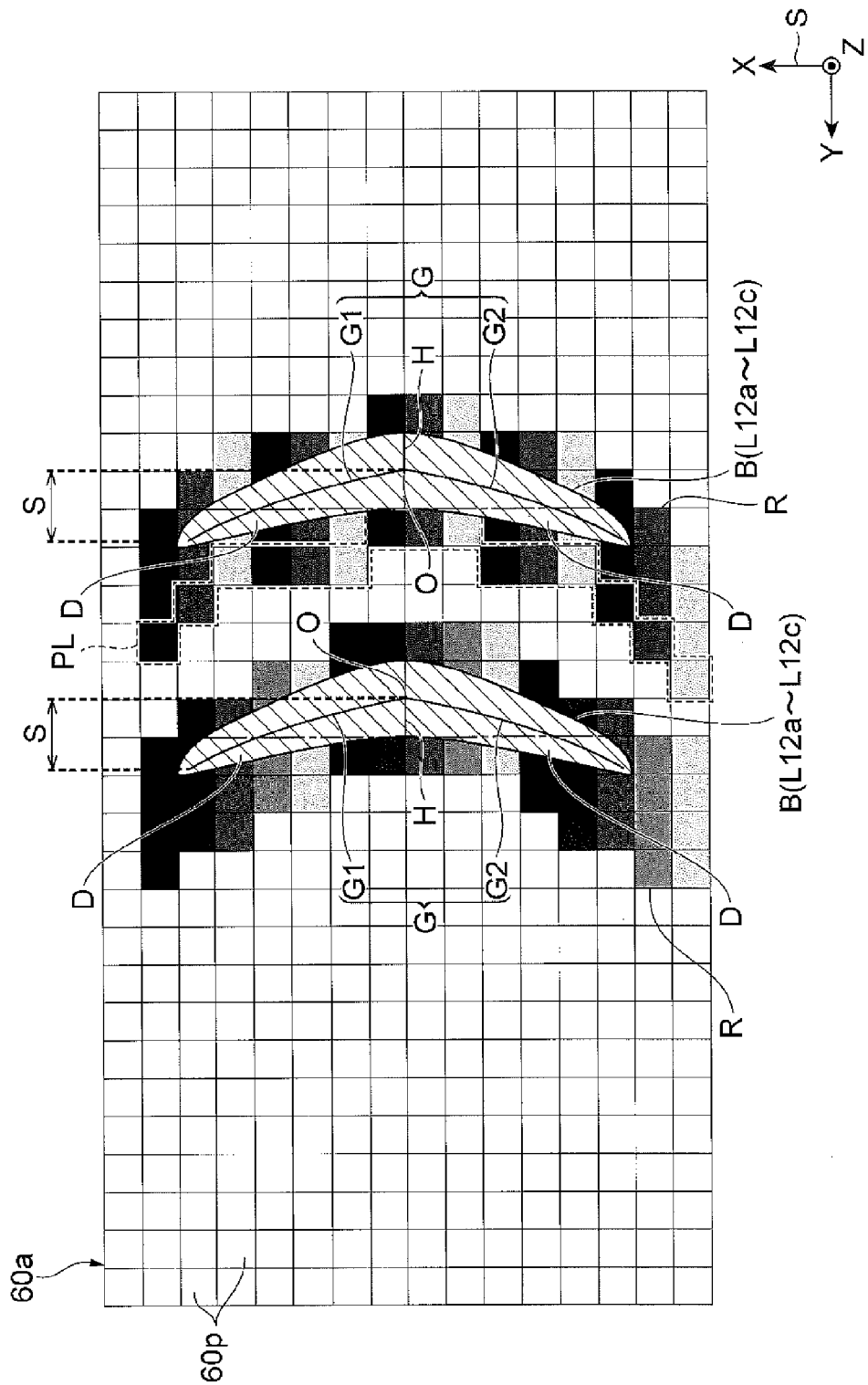
FIG. 5 is a diagram illustrating a relationship between a beam director and a beam shape.

FIG. 5 is a diagram illustrating the beam director 60 and the shape of the beam B in the XY plane (third plane), and the shape of the beam B corresponding to two wavelength components is illustrated. The shape of the beam B incident on the beam director 60 is strained ellipse resulting from distortion of an ellipse having a long axis in the X direction and a short axis in the Y direction. The long axis G of the beam B is inclined in the Y direction with respect to the X direction.

The long axis G includes a first long axis G1 and a second long axis G2. In the present embodiment, the first long axis G1 and the second long axis G2 are continuous to each other. Also, the first long axis G1, the second long axis G2, and a short axis H intersect each other at a center O of the beam B. Further, the first long axis G1 and the second long axis G2 are inclined toward the same side in the Y direction with respect to the X direction. That is, positive or negative signs of the angle of inclination in the Y direction with respect to the X direction differ from each other. On the other hand, absolute values of the angles of inclination in the Y direction with respect to the X direction are substantially equal.

Further, the wavelength dispersive element 40 is arranged symmetrical with respect to the axis C in the XZ plane. Therefore, the positive or negative signs of the angle of inclination with respect to the Z direction (in the present embodiment, matching a normal of the wavelength dispersive element 40) of the optical axis differ between a component of the beam incident from an upper side of the optical axis and a component of the beam incident from a lower side, and distributions of the absolute value of the angle of inclination are the same therebetween. Accordingly, the beam B has a shape symmetrical with respect to a straight line parallel to the Y direction through the center O.

The beam director 60 includes a beam directing region R in which a plurality of beam directing elements 60p (pixel line PL) arranged in the X direction are arranged in a predetermined number (in the present embodiment, 4) in the Y direction. In the present embodiment, two beam directing regions R arranged in the Y direction are illustrated. The beam directing region R deflects the wavelength components toward a predetermined output port 11b by independently phase-modulating each of the wavelength components. The beam directing region R is provided to correspond to the shape of the beam B.

A plurality of beam directing elements 60p (pixel line PL), which form the phase modulation pattern P illustrated in FIGS. 3 and 4, are arranged in the X direction in the beam directing region R. Also, a plurality of beam directing elements 60p (pixel line PL) forming this phase modulation pattern P are arranged in the Y direction. In this case, since the beam directing region R has a block shape, it is easy to control the beam director 60. In the present embodiment, the plurality of beam directing elements 60p (pixel line PL) forming the phase modulation pattern P in the X direction in this way are arranged by shifting in the Y direction and accordingly the beam directing region R is provided to correspond to the shape of the beam B. Further, in the beam directing region R, the beam directing elements 60p that are adjacent in the Y direction have substantially the same phase modulation amounts.

Figure 6:
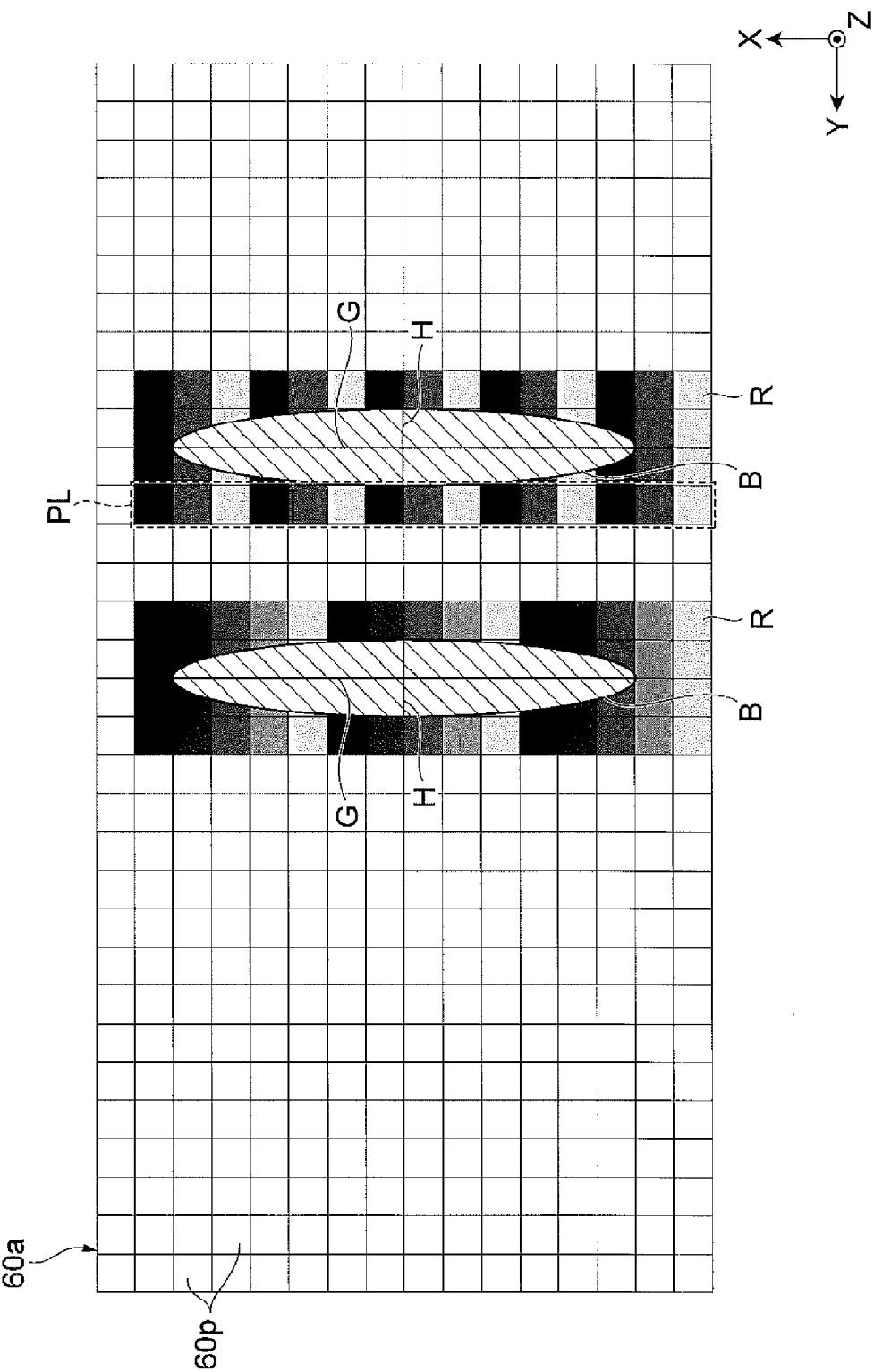
FIG. 6 is a diagram illustrating a comparative example of a relationship between the beam director and a beam shape.

FIG. 6 illustrates a comparative example of the beam director 60 and the shape of the beam B. Here, a long axis G in the shape of the beam B is not inclined with respect to the X direction. A beam directing region R differs from the beam directing region R illustrated in FIG. 5 in that the beam directing elements 60p (pixel line PL) forming the phase modulation pattern P are not arranged by shifting in the Y direction.

In the present embodiment, the long axis G of the beam B is inclined with respect to the X direction, as illustrated in FIG. 5. Accordingly, the long axis G is longer than that in the comparative example illustrated in FIG. 6. That is, the beam B of the present embodiment has a large area on the beam director 60. Further, a distortion portion D that protrudes outward from ends of a short axis H extending in the X direction is formed.

For example, the beam directing region R shown in the comparative example of FIG. 6 includes 24 beam directing elements 60p, whereas the beam directing region R of the present embodiment of FIG. 5 includes 32 beam directing elements 60p. That is, the beam can be deflected using more number of the beam directing elements 60p. Accordingly, it is possible to accurately deflect the beam.

Further, the first long axis G1 and the second long axis G2 are inclined toward the same side in the Y direction. Therefore, the beam directing elements 60p can be assigned according to the shape of the beam B more densely.

Figure 7:
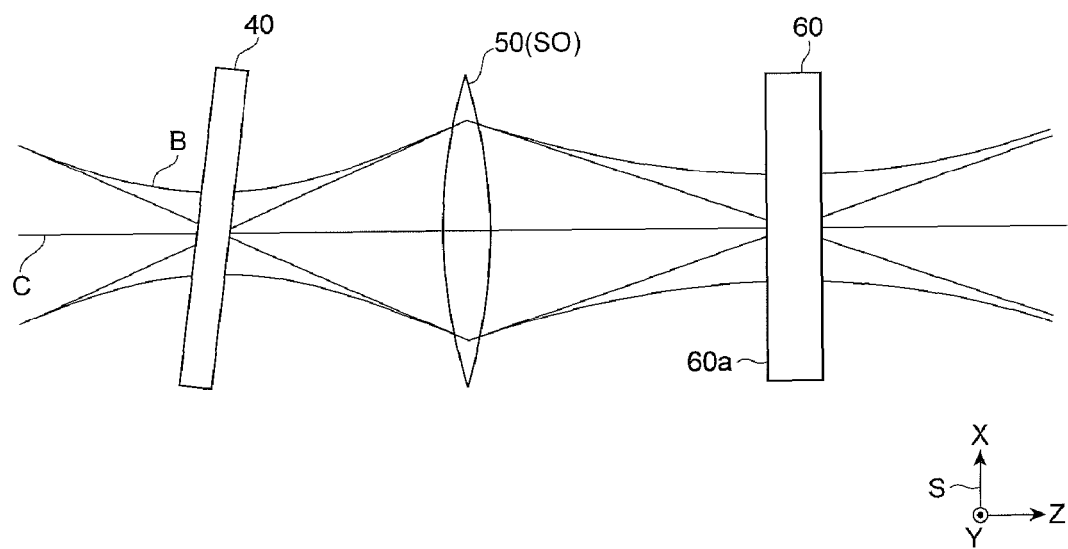
FIG. 7 is a diagram illustrating a modification example of the first embodiment of one aspect of the present invention.
Figure 8:
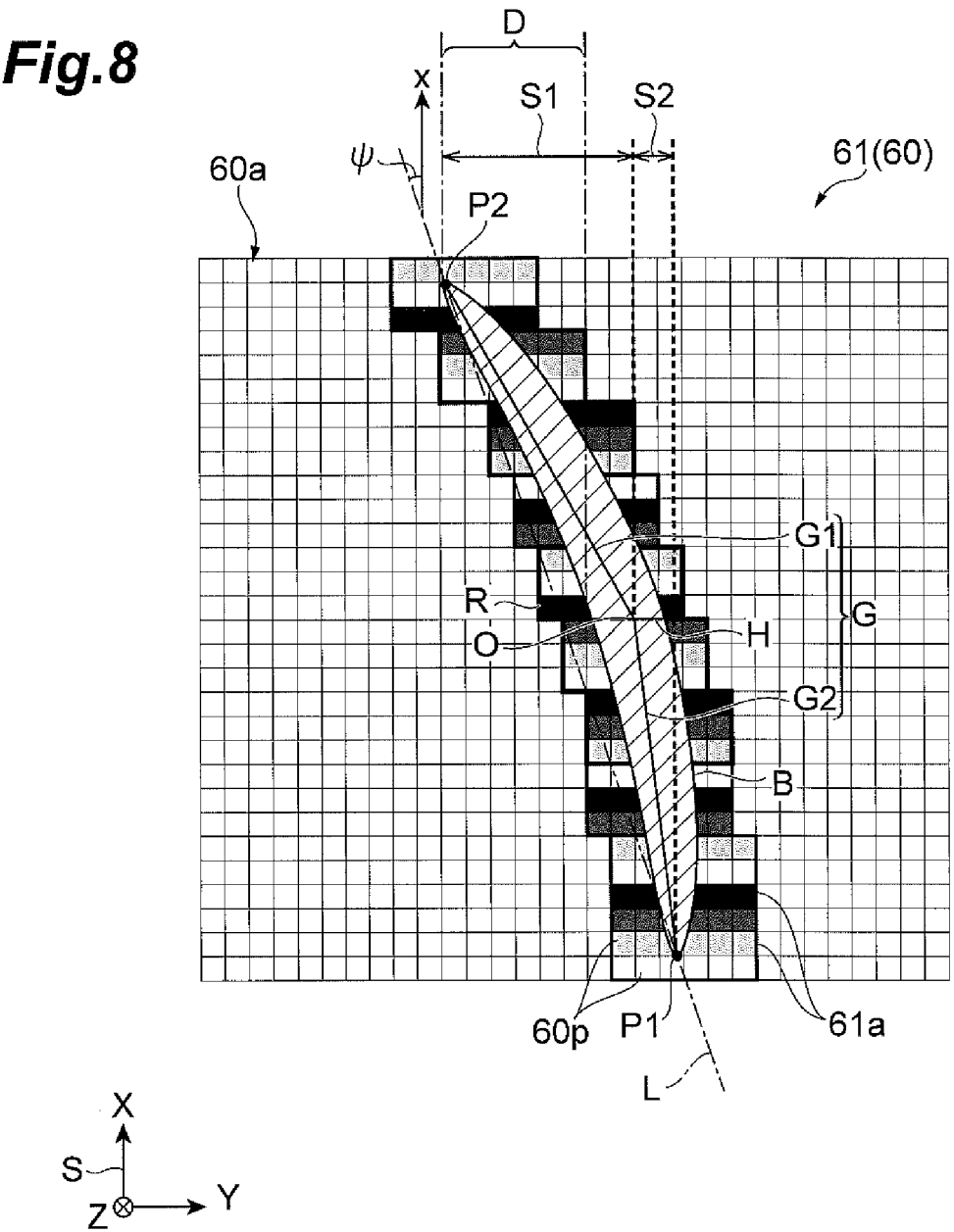
FIG. 8 is a front view illustrating an example of the beam director when viewed from a Z direction.

Further, the wavelength dispersive element 40 may be inclined with respect to the X direction in the XZ plane. That is, the wavelength dispersive element 40 may be arranged by rotating about the Y-axis. FIG. 7 is a diagram illustrating a modification example of the present invention. FIG. 8 illustrates the beam director 60 and a shape of the beam B in the XY plane according to the modification example.

The beam B has a shape that is asymmetrical with respect to a straight line parallel to a Y direction through a center O, as illustrated in FIG. 8. Also, a first long axis G1 and a second long axis G2 are inclined at different angles with respect to the X direction. Specifically, an amount of shift S1 of the first long axis G1 in the Y-axis direction is larger than an amount of shift S2 of the second long axis G2 in the Y-axis direction. In this case, since a distortion portion D increases, the number of beam directing elements 60p to be assigned to the beam B can be increased.

Next, a principle of formation of the beam of which the long axis G is inclined with respect to the X direction on the beam director 60 will be described with reference to FIG. 9. Hereinafter, a case in which an optical axis of the beam L11 is perpendicular to the diffraction grating 40 in an XZ plane will be described first.

Figure 9A:
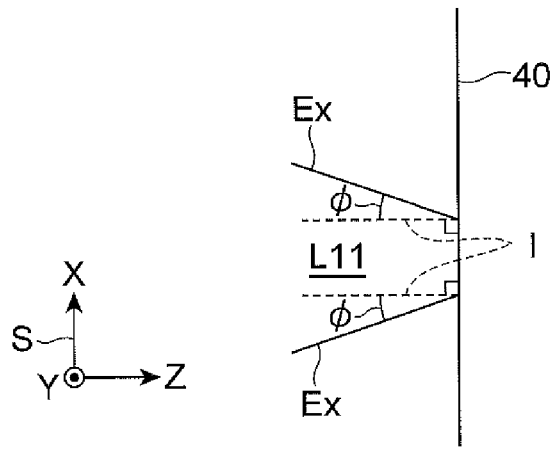
FIGS. 9A, 9B and 9C are diagrams illustrating a beam that has a expanding intensity profile in wave optics incident on a diffraction grating.
Figure 9B:
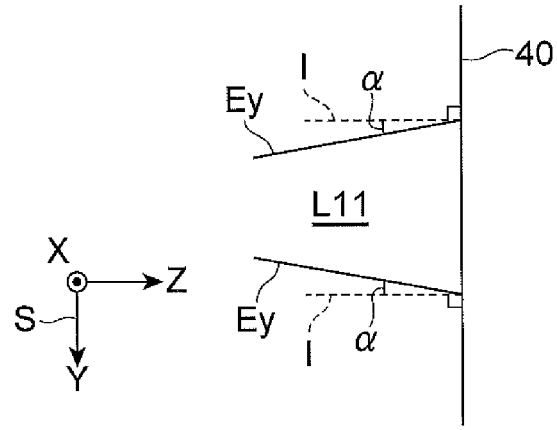
Figure 9C:
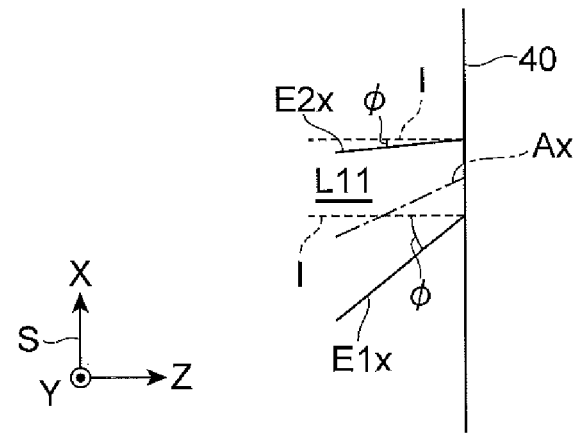

FIGS. 9A, 9B and 9C illustrates a beam that has a expanding intensity profile in wave optics incident on a diffraction grating. FIGS. 9A and 9C are diagrams in an XZ plane, and FIG. 9B is a diagram in a YZ plane. A relationship of Equation (1) below is defined among an angle Φ of incidence on the diffraction grating 40 of the beam L11 in the XZ plane, an angle α of incidence on the diffraction grating 40 of the beam L11 in the YZ plane, and an angle β of emission from the diffraction grating 40 of the beam L11 in the YZ plane.

$$\sin\beta = \frac{m\lambda}{d\cos\phi} - \sin\alpha \qquad (1)$$

m is a diffraction order of the diffraction grating 40, d is a pitch of the diffraction grating 40, and λ is a wavelength of each wavelength component contained in the beam L11. In wave optics, the beam L11 incident on the diffraction grating 40 contains components having different incidence angles φ in the XZ plane and components having different incidence angles α in the YZ plane. For example, distribution of the incidence angle φ increases as the component approaches an outline Ex on both sides of the beam L11 and decreases as the component approaches a center, as illustrated in FIG. 9A. Further, distribution of the incidence angle α increases as the component approaches an outline Ey of both sides of the beam L11 and decreases as the component approaches a center, as illustrated in FIG. 9B.

Figure 10:
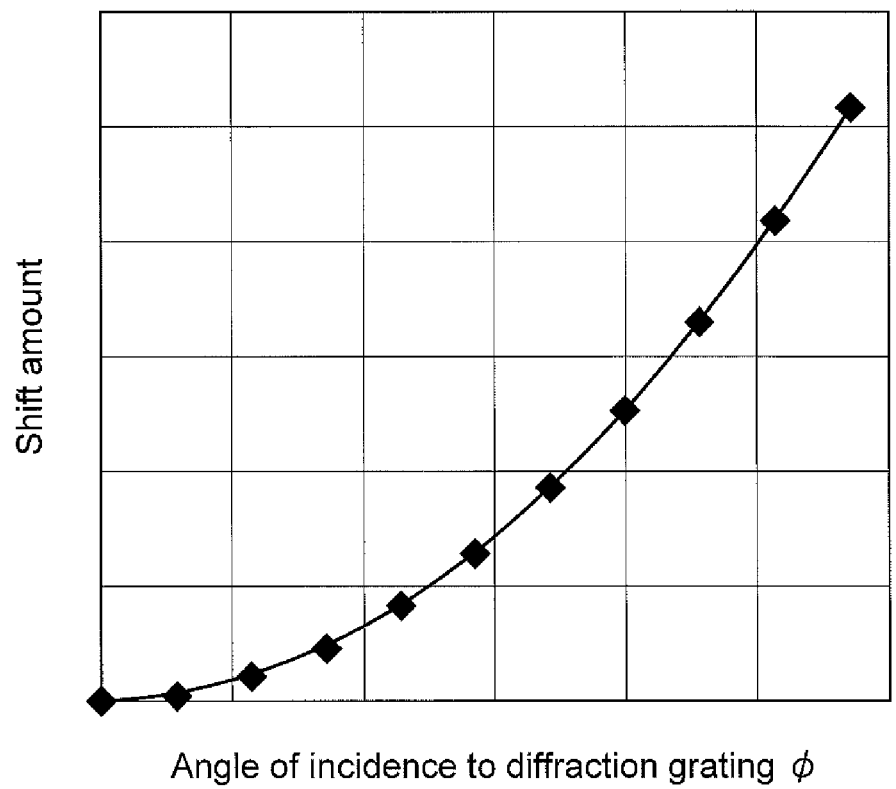
FIG. 10 is a diagram illustrating a relationship between an angle of incidence of a beam on a diffraction grating in an XZ plane and a distortion amount of a beam incident on a beam director.

This is illustrated in FIG. 10. As the angle φ of incidence on the diffraction grating 40 in the XZ plane increases, an amount of shift S of the long axis G in the Y direction gradually increases. Accordingly, the shape of the beam B becomes a shape in which the long axis G is inclined in the Y direction with respect to the X direction.

That is, according to Equation (1), the beam L11 emitted from the diffraction grating 40 contains a large number of components at a different emission angle β according to the distributions of the incidence angles φ and α. Therefore, the beam B incident on the beam director 60 has a shape distorted in a v shape in the XY plane, as illustrated in FIG. 5. That is, the beam B has a shape in which the long axis G is inclined in the Y-axis direction with respect to the X-axis direction.

Further, as a diameter of the beam L11 incident on the diffraction grating 40 increases, an absolute value of an angular component contained in the beam L11 decreases. Therefore, when the beam L11 having the long axis in the YZ plane is incident on the diffraction grating 40, a distortion amount D of the beam B incident on the beam director 60 increases. A ratio of a length of the long axis G to a length of the short axis H of the beam B (an aspect ratio) is preferably 10 or greater, and more preferably 30 or greater.

Further, when the diffraction grating 40 is inclined with respect to the X direction in the XZ plane, an optical axis Ax of the beam L11 incident on the diffraction grating 40 is inclined in the X-axis direction with respect to the normal I of the diffraction grating 40, as illustrated in FIG. 9C. Therefore, the distribution of the incidence angle φ, in the XZ plane, of the beam incident on the diffraction grating 40 is not uniform (not symmetrical) when compared with a case in which the beam is incident from the upper side of the axis C and a case in which the beam is incident from the lower side of the axis C. Specifically, the optical axis of the beam incident on the diffraction grating has a different positive or negative sign of the angle of inclination with respect to the normal I of the wavelength dispersive element 40, and different distribution of the absolute value of the inclination angle.

For example, the incidence angle $\phi$ increases in the component close to the one outline E1x of the beam L11, and decreases in the component closer to the other outline E2x. Therefore, the shape of the beam B is inclined as a whole from the X direction to the Y direction in the XY plane, as illustrated in FIG. 8.

When an angle of inclination with respect to the X direction of a straight line L connecting one endpoint P1 to the other endpoint P2 of the beam B in the X direction is $\psi$, the inclination angle $\psi$ can be greater than 0° and equal to or less than 5°. The inclination angle $\psi$ may be greater than 0° and equal to or less than 3°.

In this case, distribution of the emission angle $\beta$ within the YZ plane differs between the component of the beam incident from the upper side and the component of the beam incident from the lower side with respect to the normal I (axis C) of the diffraction grating 40 according to Equation (1). Specifically, the beam incident from the upper side has a smaller incidence angle $\phi$ and a greater output angle $\beta$ in the YZ plane than the beam incident from the lower side.

As described above, the shape of the beam B incident on the beam director 60 is inclined as a whole. Therefore, even when the beam directing elements 60p are simply arranged in a rectangular shape in the X direction and the Y direction, the beam directing element 60p may not be assigned to portions near the endpoints P1 and P2 of the beam B. In this case, a bandwidth of an output wavelength component may be limited.

In the present embodiment, the beam directing region R is arranged to be shifted in the Y direction with respect to the X direction to correspond to the inclination of the shape of the beam B. Therefore, it would be prevented from generating the portion in which the beam directing element 60p is not assigned to the beam B, and limiting of the bandwidth of the output wavelength component.

Second Embodiment

Figure 11:
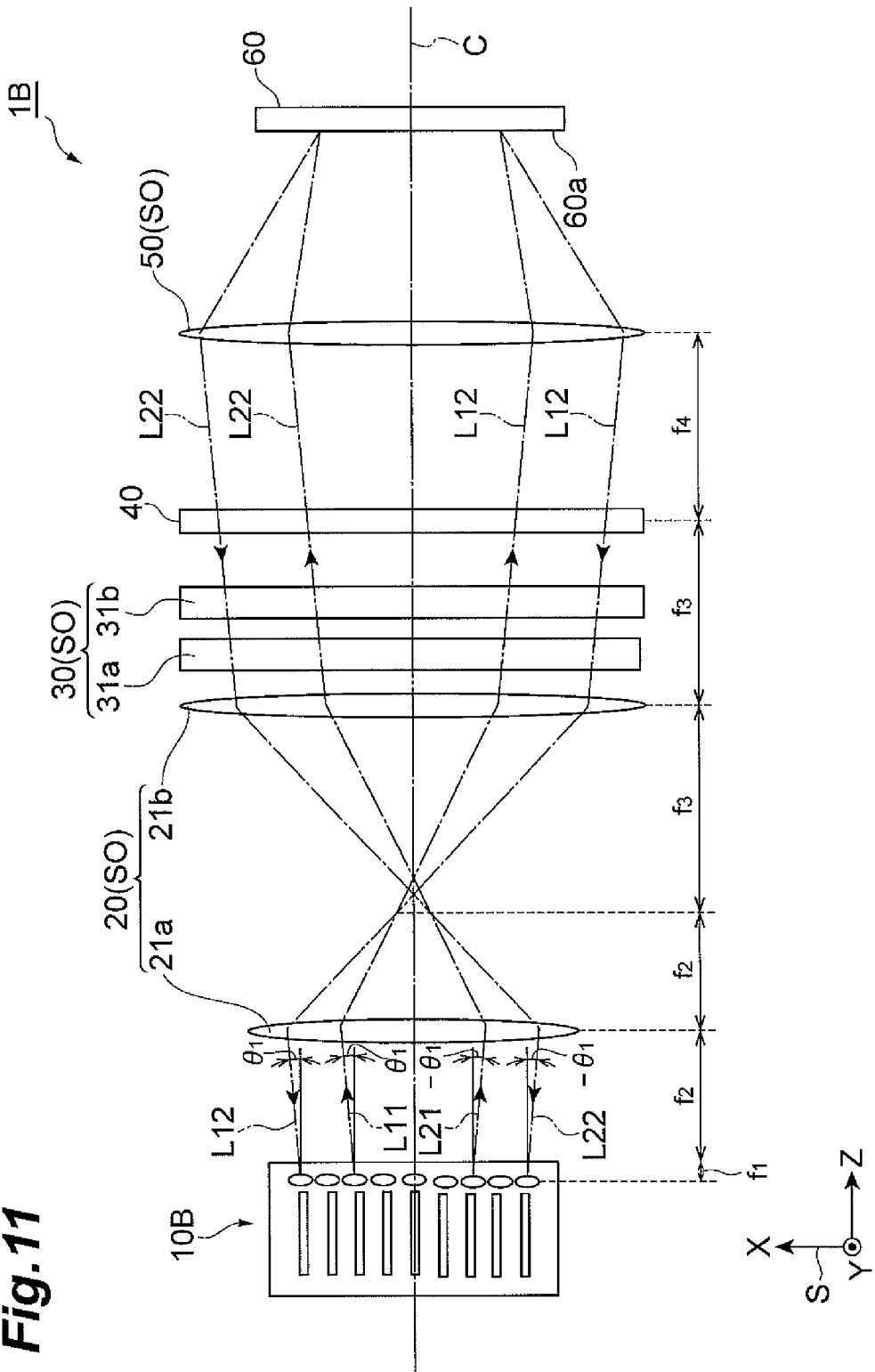
FIG. 11 is a schematic diagram illustrating a configuration of a wavelength selective switch according to a second embodiment of one aspect of the present invention.
Figure 12:
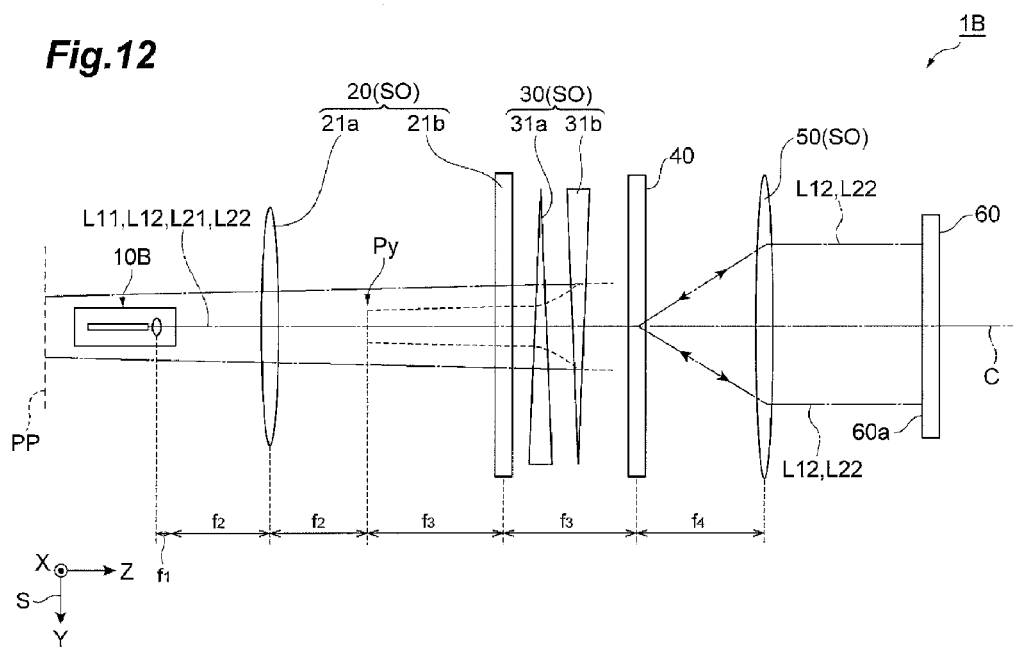
FIG. 12 is a schematic diagram illustrating a configuration of a wavelength selective switch according to the second embodiment of one aspect of the present invention.

FIGS. 11 and 12 are schematic diagrams illustrating a configuration of a wavelength selective switch according to the present embodiment. Further, a Cartesian coordinate system S is shown in some of the following drawings. FIG. 11 is a diagram illustrating a schematic configuration of the wavelength selective switch in an XZ plane (first plane) extending in an X direction (a first direction) and a Z direction (a third direction). FIG. 12 is a diagram illustrating a schematic configuration of the wavelength selective switch in a YZ plane (second plane) extending in a Y direction (a second direction) and the Z direction.

The wavelength selective switch 1B includes an input/output unit 10B, a free space optical system SO, a diffraction grating (wavelength dispersive element) 40, and a beam director 60, as illustrated in FIGS. 11 and 12. The free space optical system SO includes a relay optical system (a first optical system and a second optical system) 20, an anamorphic system 30, and a condensing element 50. The input/output unit 10B, the relay optical system 20, the anamorphic system 30, the diffraction grating 40, the condensing element 50, and the beam director 60 are arranged in this order on a predetermined axis C along the Z direction. The free space optical system SO optically couple the input/output unit 10B, the diffraction grating 40, and the beam director 60 on the predetermined axis C. Further, while the axis C is drawn in a straight line shape in FIGS. 11 and 12, the axis C may be bent by, for example, a reflecting mirror arranged therealong.

Figure 13:
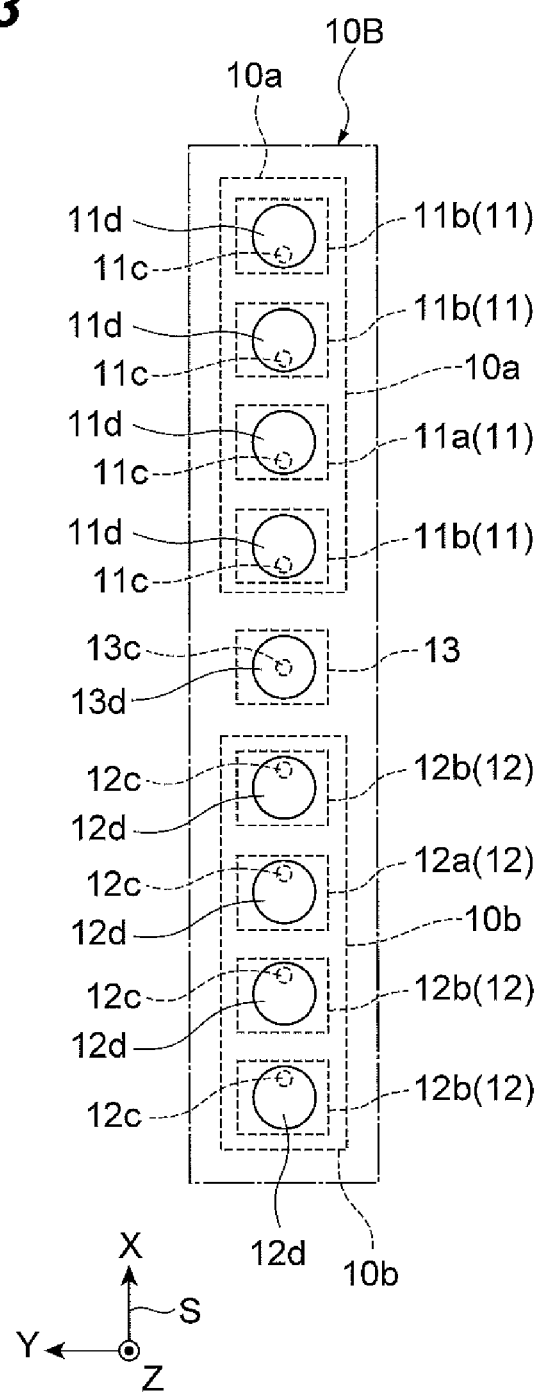
FIG. 13 is a diagram illustrating a configuration of an input/output unit when viewed from a Z direction.
Figure 14:
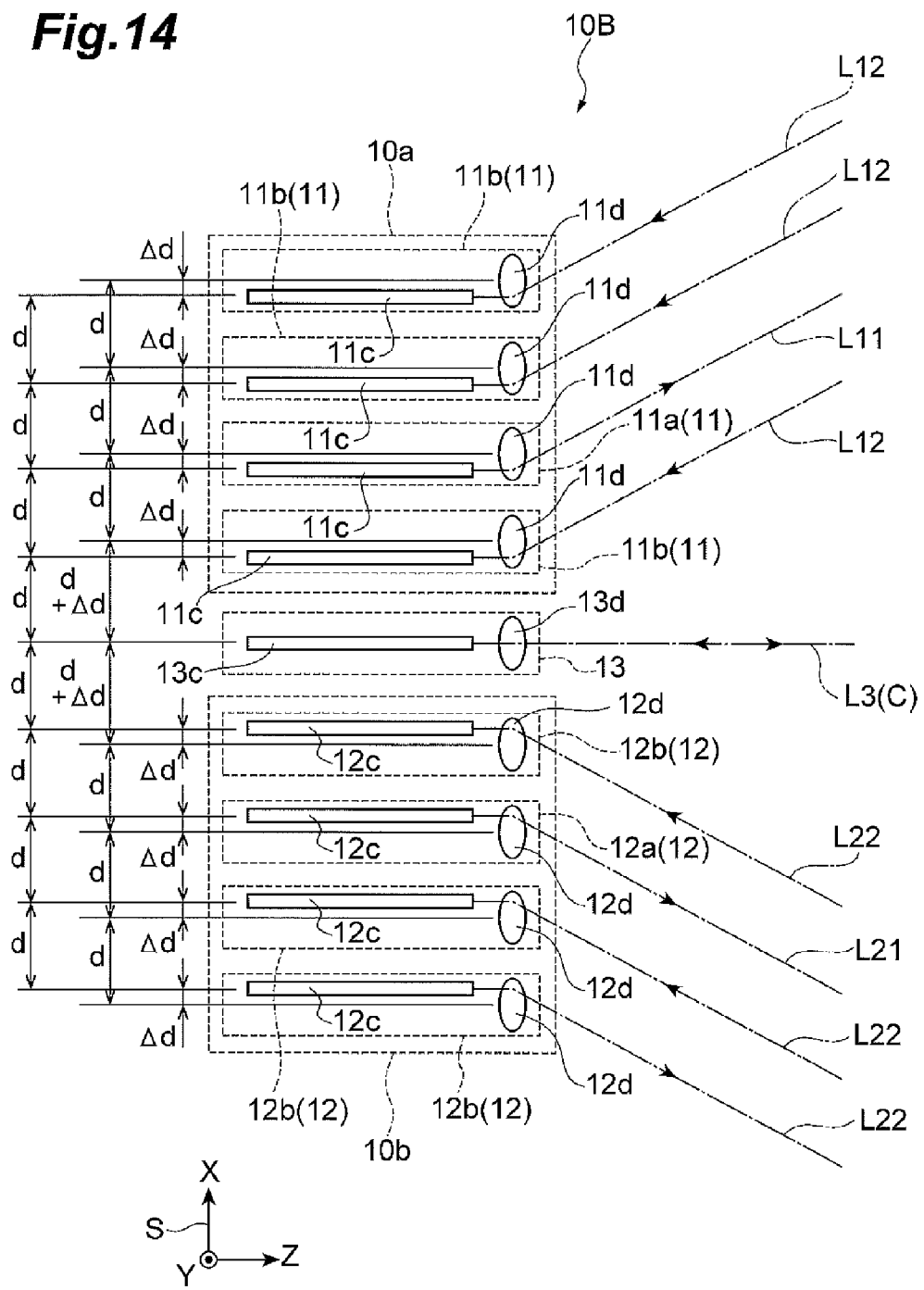
FIG. 14 is a side view illustrating a configuration of the input/output unit when viewed from a Y direction.

FIG. 13 illustrates a configuration of the input/output unit viewed from the Z direction. Further, FIG. 14 illustrates a configuration of the input/output unit viewed from the Y direction. The input/output unit 10B includes a first portion 10a and a second portion 10b, as illustrated in FIGS. 13 and 14. The first portion 10a and the second portion 10b are arranged side by side in the X direction. The input/output unit 10B includes an input port and an output port arranged in the X direction. The input port includes a first input port 11a and a second input port 12a. The output port includes a first output port 11b and a second output port 12b.

The first portion 10a includes three or more first input/output ports 11. The first input/output ports 11 are arranged in the X direction. The first input/output port 11 includes one or a plurality of first input ports 11a, and one or a plurality of first output ports 11b. One first input port 11a and a plurality of first output ports 11b are illustrated in FIGS. 13 and 14. The first input port 11a inputs a wavelength multiplexed beam L11. The first output port 11b outputs a wavelength component L12 deflected by the beam director 60.

The first input port 11a inputs the beam L11 along a first optical axis inclined in the X direction with respect to the axis C, as illustrated in FIG. 14. Further, the first output port 11b outputs the beam L12 incident on the first output port 11b along the first optical axis. When the axis C is at 0°, an angle of inclination $\theta 1$ of the first optical axis with respect to the axis C may be greater than 0° and equal to or less than 5°. Further, the inclination angle $\theta 1$ may be greater than 0° and equal to or less than 3°.

The second portion 10b includes three or more second input/output ports 12. The second input/output ports 12 are arranged in the X direction. The second input/output port 12 includes one or a plurality of second input ports 12a and one or a plurality of second output ports 12b. One second input port 12a and a plurality of second output ports 12b are illustrated in FIGS. 13 and 14. The second input port 12a inputs a wavelength multiplexed beam L21. The second output port 12b outputs a wavelength component L22 deflected by the beam director 60.

The second input port 12a inputs the beam L21 along a second optical axis inclined in the X direction with respect to the axis C, as illustrated in FIG. 14. Further, the second output port 12b outputs the beam L22 incident on the second output port 12b along the second optical axis. The angle of inclination of the second optical axis with respect to the axis C differs from the angle of inclination $\theta 1$ of the first optical axis and is, for example, $-\theta 1$.

Thus, the input/output unit 10B is configured to input and output at least beams (first beams) L11 and L12 having the first optical axis and beams (second beams) L21 and L22 having the second optical axis in the input/output unit 10B.

The first input port 11a and the first output port 11b include optical fibers 11c and condensing elements (condensing lenses) 11d. The condensing elements 11d are provided in one-to-one correspondence with optical fibers 11c, and each is optically coupled to an end face of the corresponding optical fiber 11c. Similarly, the second input port 12a and the second output port 12b include optical fibers 12c and condensing elements (condensing lenses) 12d. The condensing elements 12d are provided in one-to-one correspondence with the optical fibers 12c, and each is optically coupled to an end face of the corresponding optical fiber 12c.

An optical axis of each optical fiber 11c and an optical axis of each condensing element 11d corresponding to the optical fiber 11c are offset in the X direction, as illustrated in FIG. 14. More specifically, the optical axis of the condensing element 11d is offset by Δd (>0) upward with respect to the optical axis of the optical fiber 11c. An amount Δd of the offset is equal between the first input port 11a and the first output port 11b. Accordingly, a positive angle of inclination θ1 corresponding to the first optical axis is assigned to the first beams L11 and L12. The three or more optical fibers 11c are at intervals d and are arranged at equal intervals. Further, the three or more condensing elements 11d corresponding to the optical fibers 11c are at intervals d and are arranged at equal intervals.

The optical axis of each optical fiber 12c and the optical axis of the condensing element 12d corresponding to the optical fiber 12c are offset in the X direction. More specifically, the optical axis of the condensing element 12d is offset downward by −Δd with respect to the optical axis of the optical fiber 12c. That is, an offset direction differs from the direction in which the optical axis of the optical fiber 11c and the optical axis of the condensing element 11d are offset. Further, the amount −Δd of the offset is equal between the second input port 12a and the second output port 12b. Accordingly, a negative angle of inclination −θ1 corresponding to the second optical axis is assigned to the second beams L21 and L22. The three or more optical fibers 12c are at intervals d and are arranged at equal intervals. Further, the three or more condensing elements 12d corresponding to the optical fibers 12c are also at intervals d and are arranged at equal intervals.

The input/output unit 10B further includes an aligning port 13, in addition to the first input/output port 11 and the second input/output port 12. The aligning port 13 inputs and outputs an aligning beam L3 having an optical axis along the axis C. This aligning port 13 further includes an optical fiber 13c, and a condensing element 13d optically coupled to an end face of the optical fiber 13c. However, the optical axis of the optical fiber 13c and the optical axis of the condensing element 13d match each other. Therefore, the beam L3 propagates along the axis C.

The aligning port 13 may be provided in common between the first portion 10a and the second portion 10b, as illustrated in FIGS. 13 and 14. Further, at least one aligning port 13 may be provided in each of the first portion 10a and the second portion 10b. Here, one aligning port 13 is arranged between the first portion 10a and the second portion 10b.

The optical fibers 11c, 12c and 13c adjacent to one another are arranged at intervals d. On the other hand, the condensing elements 11d, 12d and 13 d adjacent to one another are arranged at intervals d+Δd. An offset amount Δd of the optical axis of the optical fiber 11c and the optical axis of the condensing element 11d and an offset amount −Δd of the optical axis of the optical fiber 12c and the optical axis of the condensing element 12d are realized. In other words, the optical fibers 11c, 12c and 13c are arranged at an equal pitch, and the condensing elements 11d, 12d and 13 d are arranged at a different pitch. Also, the condensing element 11d is shifted to a positive side of the X direction with respect to the optical fiber 11c, and the condensing element 12d is shifted to a negative side of the X direction with respect to the optical fiber 12c.

The relay optical system 20 includes lenses 21a and 21b, as illustrated in FIGS. 11 and 12. The relay optical system 20 is provided in common between the first input/output port 11 and the second input/output port 12, and is provided in common between the first beams L11 and L12 and the second beams L21 and L22. The lens 21a, for example, is a convex spherical lens having optical power in the XZ plane and the YZ plane. The lens 21a is arranged on the front side (on the input/output unit 10B side on the axis C) relative to the lens 21b. Further, the lenses 21a and 21b are not limited to transmissive lenses and may be reflective lenses such as concave mirrors.

A front focus of the lens 21a substantially matches a rear focus of the condensing elements 11d to 13d. That is, the lens 21a is arranged in a position away from the condensing elements 11d to 13d by the focal length f1 of the condensing elements 11d to 13d and the focal length f2 of the lens 21a. Further, the "front side" and "rear side" in the present embodiment refer to "the input/output unit 10B side" and "the beam director 60 side" in the axis C direction, respectively.

In the XZ plane and the YZ plane, the lens 21a may relatively increase the beam size in the beam waist position of the emitted beams L11 and L21 in comparison with the beam size in the beam waist position of the incident beams L11 and L21. Thus, optical loss in the first input/output port 11 and the second input/output port 12 may be suppressed. Hereinafter, the "beam size" is assumed to indicate a size of the beam in the beam waist position.

The lens 21b has optical power at least in the XZ plane. In the present embodiment, the lens 21b is a cylindrical lens and has optical power only in the XZ plane. In the beams L11 and L21 passing through the lens 21b, the beam size in the XZ plane is relatively smaller than the beam size in the YZ plane (i.e., is relatively expanded in the YZ plane).

The front focus of the lens 21b substantially matches the rear focus of the lens 21a. Further, the rear focus of the lens 21b substantially matches the front focus of the condensing element 50. That is, the lens 21b is arranged in a position away from the lens 21a by a focal length f2 of the lens 21a and a focal length f3 of the lens 21b. Further, the lens 21b is arranged in a position away from the condensing element 50 by the focal length f3 of the lens 21b and a focal length f4 of the condensing element 50.

The anamorphic system 30 is arranged on the front or rear side of the relay optical system 20. The anamorphic system 30 is provided in common between the first input/output port 11 and the second input/output port 12, and is provided in common between the first beams L11 and L12 and the second beams L21 and L22. In the present embodiment, the anamorphic system 30 converts shapes of the first beam L11 and the second beam L21. More specifically, the anamorphic system 30 converts the shapes of the beams L11 and L21 so that a beam size of the beams L11 and L21 in the YZ plane is relatively greater than that of the beams L11 and L21 in the XZ plane. For example, the anamorphic system 30 expands the size of the beams L11 and L21 in the YZ plane. The anamorphic system 30 includes a pair of prisms 31a and 31b, for example.

The aspect ratio in the XY plane of the beams L11 and L21 emitted from the anamorphic system 30 is equal to or greater than 10. Alternatively, the aspect ratio is equal to or greater than 40. Further, the aspect ratio is a value resulting from division of the beam size of the beams L11 and L21 in the YZ plane by the beam size of the beams L11 and L21 in the XZ plane.

The diffraction grating 40 is provided in common between the first input/output port 11 and the second input/output port 12, and is provided in common between the first beams L11 and L12 and the second beams L21 and L22. The diffraction grating 40 changes an optical axis of the first beams L11 and L12 and the second beams L21 and L22 at an angle according to the wavelength in the Y direction. That is, the diffraction grating 40 disperses the wavelength multiplexed beams L11 and L21 into wavelength components in the YZ plane. Only certain representative wavelength components L12 and L22 among a plurality of wavelength components are illustrated in FIGS. 11 and 12.

In the XZ plane, the optical axes of the beams L11 and L21 incident on the diffraction grating 40 are inclined with respect to the normal of the diffraction grating 40. In the present embodiment, the positive or negative sign of the angle of inclination with respect to the normal of the diffraction grating 40 of the optical axis of the first beam L11 and a positive or negative sign of the angle of inclination with respect to the normal of the diffraction grating 40 of the optical axis of the second beam L21 differ from each other. On the other hand, absolute values of the inclination angles are equal. The absolute values of the angle of inclination of the beams L11 and L21 may be greater than 0° or equal to or less than 5°. Further, the absolute values may be greater than 0° or equal to or less than 3°.

The condensing element 50 condenses the respective wavelength components L12 and L22 emitted from the diffraction grating 40. The beam expanded at predetermined magnification in the Y direction in the anamorphic system 30 is condensed to reduce the magnification in the Y direction. That is, the condensing element 50 condenses the beam so that the beam size of the beams L12 and L22 in the YZ plane is relatively smaller than that of beams L12 and L22 in the XZ plane. The condensing element 50 is, for example, a convex spherical lens, and has optical power in the XZ plane and the YZ plane.

The beam director 60 includes a plurality of beam directing elements so as to deflect the beams L12 and L22 toward the predetermined first output port 11b and second output port 12b. The configuration and the function of the beam director 60 are the same as those in the first embodiment.

Figure 15:
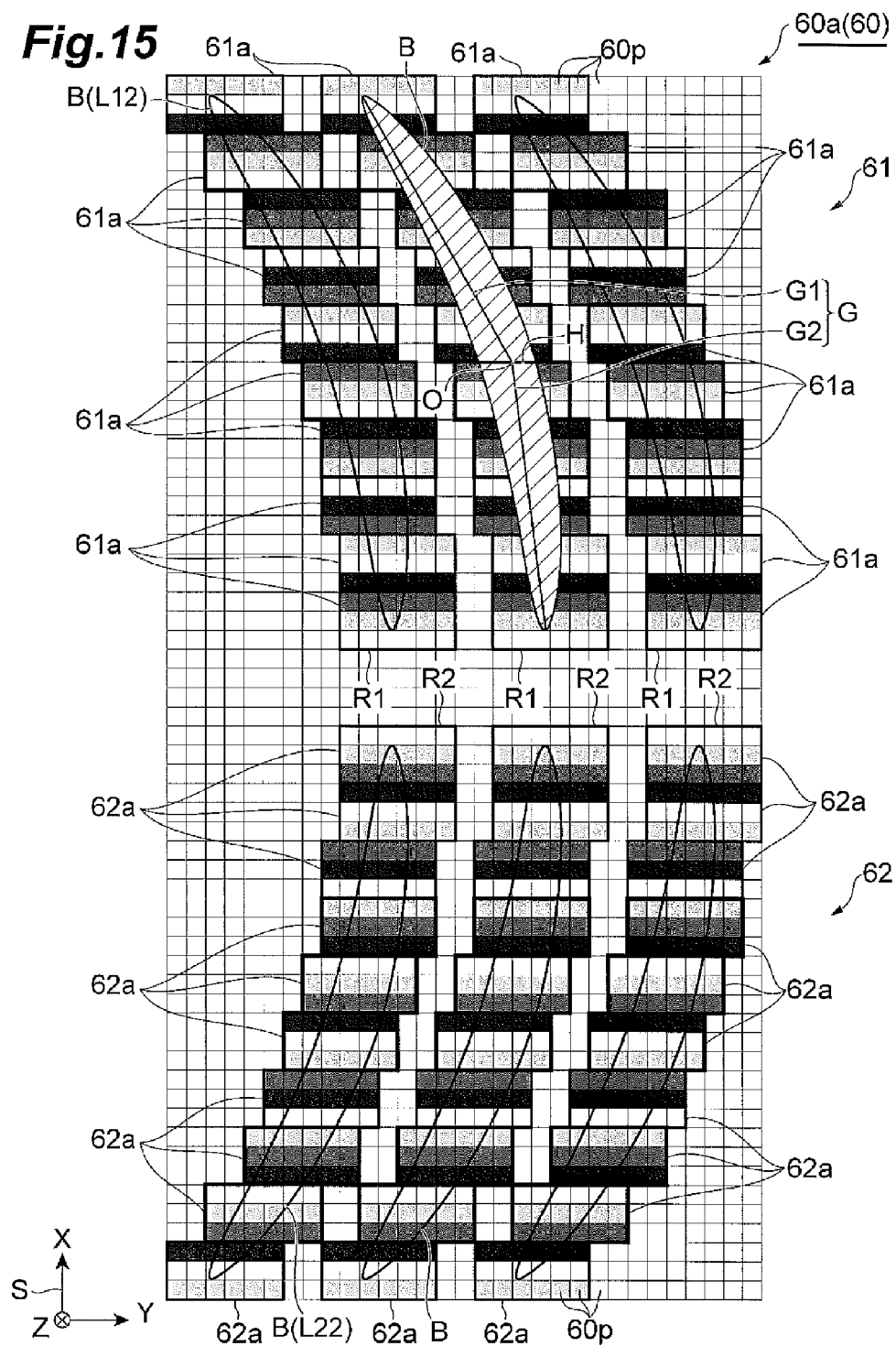
FIG. 15 is a front view illustrating an example of a beam director when viewed from a Z direction.

FIG. 15 illustrates an example of the beam director 60 viewed from the Z direction. The beam director 60 includes a first beam directing unit 61 and a second beam directing unit 62 arranged in the X direction.

The first beam directing unit 61 includes a plurality of first beam directing regions R1. Also, each first beam directing region R1 includes a plurality of first sub beam directing regions 61a. The first sub beam directing regions 61a include beam directing elements 60p arranged two-dimensionally in an XY plane. The first beam directing unit 61 receives each wavelength component in the corresponding first beam directing region R1, and deflects the wavelength component to the first output port 11b using the plurality of first sub beam directing regions 61a. In FIG. 15, ten first sub beam directing regions 61a are assigned to one wavelength component.

The second beam directing unit 62 includes a plurality of second beam directing regions R2. Also, each second beam directing region R2 includes a plurality of second sub beam directing regions 62a. The second sub beam directing regions 62a also include beam directing elements 60p arranged in two-dimensionally in the XY plane. Also, the second beam directing unit 62 receives each wavelength component in the corresponding second beam directing region R2 and deflects the wavelength component to the second output port 12b using the plurality of second sub beam directing regions 62a. In FIG. 15, ten second sub beam directing regions 62a are assigned to one wavelength component.

In the first beam directing region R1 and the second beam directing region R2, a plurality of beam directing elements 60p (pixel line PL) forming the phase modulation pattern P illustrated in FIGS. 3 and 4 are arranged in the X direction. Also, a plurality of beam directing elements 60p (pixel line PL) forming this phase modulation pattern P are arranged in the Y direction. In this case, since the first sub beam directing region 61a and the second sub beam directing region 62a have a block shape, it is easy to control the beam director 60. In the present embodiment, the beam directing elements 60p (pixel line PL) forming the phase modulation pattern P are arranged by shifting in the Y direction so that the first beam directing region R1 and the second beam directing region R2 are provided to correspond to the shape of the beam B. Further, in the first sub beam directing region 61a and the second sub beam directing region 62a, the beam directing elements 60p adjacent in the Y direction have substantially the same amount of phase modulation. The shade of the color of the beam directing element 60p in FIG. 15 indicates a depth of the phase modulation amount.

In the present embodiment, a beam B (for example, beams L12 and L22) having a distorted shape is incident on the beam director 60. FIG. 15 illustrates a relationship between a modulation surface 60a of the beam director 60 and the shape in the XY plane of the beam B, in which the beam B corresponding to three wavelength components is illustrated. A long axis G of the beam B is inclined in the Y direction with respect to the X direction.

The long axis G includes a first long axis G1 and a second long axis G2 that are continuous to each other. The first long axis G1 and the second long axis G2 are inclined toward opposite sides in the Y direction with respect to the X direction. That is, a positive or negative sign of the angle of inclination in the Y direction with respect to the X direction is the same. Further, an absolute value of the angle of inclination in the Y direction with respect to the X direction differs.

The diffraction grating 40 is arranged symmetrically with respect to an axis C (in the present embodiment, matching a normal of the diffraction grating 40) in the XZ plane. Therefore, between the component of the beam incident from the upper side of the axis C and the component of the beam incident from the lower side, the positive or negative sign of the angle of inclination with respect to the axis C differs, and distribution of the absolute value of the inclination angle is the same. Accordingly, the shapes of the beam B incident on the first directing unit 61 and the second directing unit 62 are symmetrical with respect to the Y axis.

A principle of incidence on the beam director 60 of the beam B having a distorted shape is the same as that in Embodiment 1. In the present embodiment, an optical axis Ax of the beam L11 incident on the diffraction grating 40 is inclined in the X direction with respect to the normal I of the diffraction grating 40, as illustrated in FIG. 9C. Therefore, in practice, an incidence angle φ, in the XZ plane, of the beam L11 incident on the diffraction grating 40 increases as the component approaches one outline E1x of the beam L11 and decreases as the component approaches the other outline E2x of the beam L11. That is, the distribution of the incidence angle φ of the beam L11 in the XZ plane is not symmetrical with respect to the optical axis Ax of the beam L11. Therefore, the shape of the beam B (for example, beam L12) emitted from the diffraction grating 40 and incident on the beam director 60 is not only distorted in the v shape as described above, but also inclined as a whole from the X direction to the Y direction in the XY plane, as illustrated in FIG. 8.

Therefore, when the beam directing elements 60p are arranged in a rectangular shape in the X direction and the Y direction forming a single beam directing region, endpoints of the beam B may protrude from the beam directing region. In this case, a bandwidth of the output beam may be limited.

Figure 16:
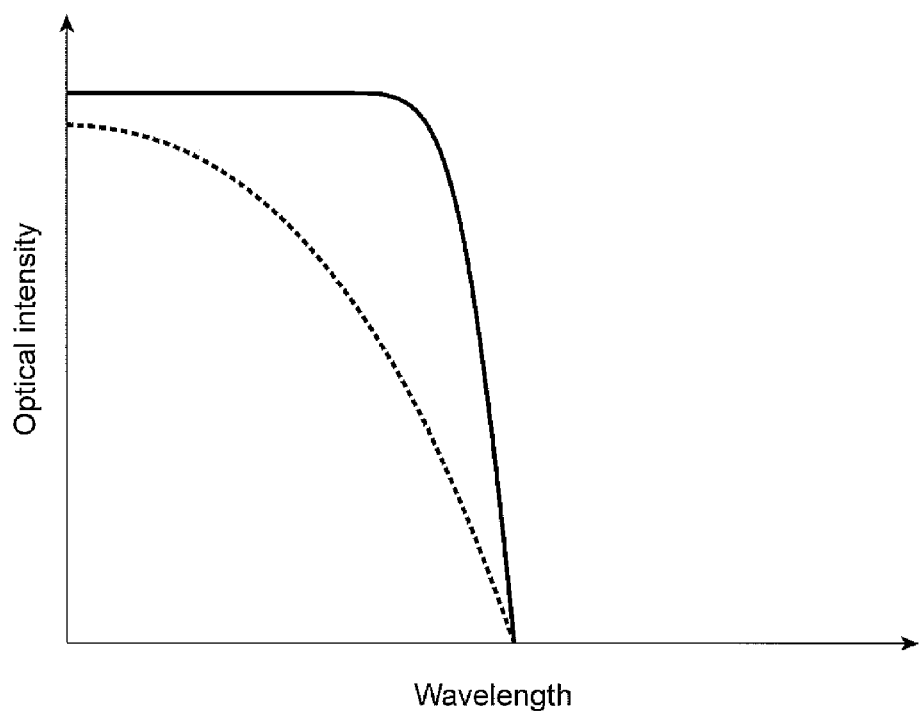
FIG. 16 is a graph showing a spectrum of an output beam in the wavelength selective switch according to the present embodiment and a spectrum of an output beam according to the comparative example.

In the present embodiment, the plurality of first sub beam directing regions 61a are assigned to the beam B. Also, the first sub beam directing regions 61a are arranged by shifting in a certain direction (here, the Y direction) to correspond to the inclination of the beam B. Therefore, it would be prevented from generating a portion in which the beam directing element 60p is not assigned to the beam B, and a limiting of the bandwidth of the output beam. FIG. 16 is a graph showing an optical intensity spectrum of an output beam in the wavelength selective switch of the present embodiment (solid line) and the comparative example (dashed line). In the present embodiment, a top flat region is expanded and the bandwidth is expanded.

In the present embodiment, there is a regularity that a shift amount of the first sub beam directing regions 61a correspond to the distortion and the inclination of the beam B, as illustrated in FIG. 8. The beam director 60 is controlled so that the shift amount of the first sub beam directing regions 61a in the Y direction increases from the one endpoint P1 to the other endpoint P2 of the beam B. Specifically, in four first sub beam directing regions 61a from the endpoint P1 side, one pixel is shifted in the Y direction every six pixels in the X direction (that is, every two first sub beam directing regions 61a).

Further, one pixel is shifted in the Y direction every three pixels in the X direction (that is, every first sub beam directing region 61a) in the four first sub beam directing regions 61a on the endpoint P2 side from said four first sub beam directing regions 61a. Also, two pixels are shifted in the Y direction every three pixels in the X direction (that is, every first sub beam directing region 61a) in two first sub beam directing regions 61a from the endpoint P2 side.

Adjustment of a beam waist position of the beams L11 and L21 will be described with reference to FIGS. 11 and 12. Further, a waist position of a beam incident on the lens is referred to as a "front waist position," and a waist position of a beam emitted from the lens is referred to as a "rear waist position."

In the present embodiment, the beam waist positions in the XZ plane and the YZ plane are independently adjusted.

In the XZ plane, a front focus of the lens 21a of the relay optical system 20 substantially matches a rear focus of the condensing elements 11d to 13d. Accordingly, a front waist position of the lens 21a substantially matches the front focus of the lens 21a. Therefore, the rear waist position of the lens 21a substantially matches the rear focus of the lens 21a.

In the XZ plane, the rear focus of the lens 21a substantially matches the front focus of the lens 21b. Therefore, the front waist position of the lens 21b substantially matches the front focus of the lens 21b, and the rear waist position of the lens 21b substantially matches the rear focus of the lens 21b.

The diffraction grating 40 is arranged in the rear focus of the lens 21b. That is, the diffraction grating 40 is arranged at the rear waist position of the lens 21b. Thus, the relay optical system 20 functions as first optical system that match the waist positions in the XZ plane of the beams L11 and L21 to the position of the diffraction grating 40.

In the YZ plane, a front waist position of the lens 21a substantially matches the front focus of the lens 21a, and a rear waist position Py of the lens 21a substantially matches the rear focus of the lens 21a. The lens 21b has no optical power in the YZ plane. Therefore, the waist position in the YZ plane of the beams L11 and L21 incident on the diffraction grating 40 does not substantially match the position of the diffraction grating 40, as illustrated in FIG. 12. That is, the relay optical system 20 functions as second optical system that shift the waist position in the YZ plane of the beams L11 and L21 from the position of the diffraction grating 40.

The beams L11 and L21 are incident on the diffraction grating 40 in the beam waist position in the XZ plane. On the other hand, the beams L11 and L21 are not incident on the diffraction grating 40 in the beam waist position in the YZ plane. Therefore, distribution of the incidence angle α in the YZ plane of the beams L11 and L21 incident on the diffraction grating 40 is relatively smaller than that of the incidence angle φ in the XZ plane. As a result, influence of the distribution of the incidence angle α on the emission angle β, in the YZ plane, of the beams L12 and L22 emitted from the diffraction grating 40 can relatively decrease.

The beams L11 and L21 emitted from the relay optical system 20 are expanded in the YZ plane by the anamorphic system 30 and then are incident on the diffraction grating 40. Therefore, a substantial beam waist position of the beams L11 and L21 incident on the diffraction grating 40 becomes a position PP on the front side relative to the rear waist position Py of the lens 21a. That is, the anamorphic system 30 functions as an optical system that expand a distance from the beam waist position in the YZ plane of the beams L11 and L21 incident on the diffraction grating 40 to the diffraction grating 40.

Accordingly, the beams L11 and L21 incident on the diffraction grating 40 are sufficiently separate from the beam waist in the YZ plane. Therefore, the distribution of the incidence angle α decreases. As a result, the influence of the incidence angle α on the angle β of emission from the diffraction grating 40 in the YZ plane can decrease.

The wavelength selective switch according to the present invention is not limited to the embodiments described above and can be modified without departing from the gist of each claim.

Figure 17A:
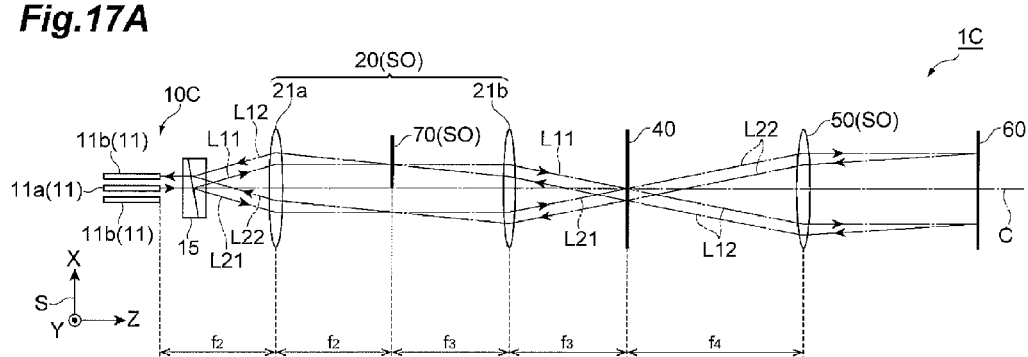
FIGS. 17A and 17B are diagrams illustrating a modification example of a second embodiment of one aspect of the present invention.
Figure 17B:
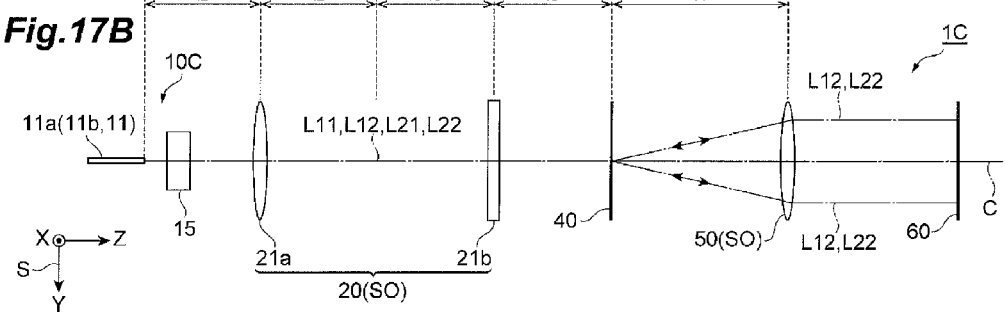

For example, a wavelength selective switch 1C illustrated in FIG. 17 includes a input/output unit 10C. Further, the free space optical system SO further includes a λ/2 wave plate 70. In FIG. 17, the anamorphic system 30 of the free space optical system SO is omitted.

The input/output unit 10C includes a polarization diversity element 15. Further, the input/output unit 10C includes a first input/output port 11, and the first input/output port 11 includes a first input port 11a and a first output port 11b. An optical axis of the optical fiber 11c and an optical axis of a condensing element 11d match each other. Therefore, the first input port 11a inputs a beam along an axis C. Further, the first output port 11b outputs the beam incident on the first output port 11b along the axis C.

The polarization diversity element 15 is optically coupled to the first input/output port 11. The polarization diversity element 15 separates the beam input from the first input port 11a into two polarization components L11 and L21 having different polarizations (a horizontal polarization and a vertical polarization) along the X direction. Optical axes of the polarization components L11 and L21 are inclined at different angles in the X direction with respect to the axis C. The polarization diversity element 15 can be configured by combining a plurality of wedge-shaped birefringent crystals. Also, the polarization components L11 and L21 are separated and output at different angles depending on the angle of the wedge.

Thus, the input/output unit 10C inputs or outputs beams (first beams) L11 and L12 having a first optical axis inclined in the X direction with respect to the axis C. Further, the input/output unit 10C inputs or outputs beams (second beams) L21 and L22 having a second optical axis inclined in the X direction with respect to the axis C and. Also, the angle of inclination of the first optical axis and the angle of inclination of the second optical axis with respect to the axis C differ from each other.

The polarization components L11 and L21 are incident on the relay optical system 20. The λ/2 wave plate 70 is arranged on an optical path of one of the polarization components L11 and L21. For example, the λ/2 wave plate 70 is arranged between a lens 21a and a lens 21b and is arranged at the rear focus of the lens 21a. Accordingly, a size of the λ/2 wave plate 70 may be reduced.

The diffraction grating 40 and the beam director 60 that is an LCOS have polarization dependence, and suffer from optical loss (polarization dependent loss: PDL) depending on a polarization state of the incident beam. However, in the present embodiment, the polarization states of polarization components L11 and L21 are made the same when the input/output unit 10C and the free space optical system SO including the λ/2 wave plate 70 are included. The polarization components L11 and L21 and the polarization components L12 and L22 having the same polarization state can be incident on the diffraction grating 40 and the beam director 60. Thus, PDL may be suppressed.

The optical axis of the wavelength component L11 and the optical axis of the wavelength component L21 incident on the diffraction grating 40 are inclined with respect to the normal of the diffraction grating 40 in the XZ plane. Also, the respective wavelength components L12 and L22 are emitted from the diffraction grating 40. The wavelength components L12 and L22 are incident on the beam director 60 through the condensing element 50. The positions on which the respective wavelength components L12 and L22 are incident differ from each other in the X direction. The beam director 60 includes a first beam directing unit 61 that deflects the wavelength component L12 toward the first output port 11b, and a second beam directing unit 62 that deflects the wavelength component L22 toward the first output port 11b. The first beam directing unit 61 includes a plurality of first sub beam directing regions 61a. The second beam directing unit 62 includes a plurality of second sub beam directing regions 62a.

In the wavelength selective switch 1C, the beams L12 and L22 incident on the diffraction grating 40 at different angles and dispersed are incident on the beam director 60. Therefore, shapes of the beams L12 and L22 incident on the beam director 60 are inclined in the Y direction with respect to the X direction. Therefore, limiting of a bandwidth of output light is suppressed by controlling the beam directing region according to the shape of the beam incident on the beam director 60.

What is claimed is:

1. A wavelength selective switch comprising:
   an input/output unit including an input port for inputting a beam and an output port for outputting the beam arranged in a first direction;
   a wavelength dispersive element dispersing the beam input from the input port into wavelength components along a second direction intersecting the first direction;
   a beam director deflecting the wavelength component in the first direction to direct the wavelength component to the predetermined output port; and
   a free space optical system optically coupling the input/output unit, the wavelength dispersive element, and the beam director on a predetermined axis along a third direction intersecting the first direction and the second direction,
   wherein the free space optical system converts a shape of the beam incident on the beam director such that a size extending in a second plane including the second direction and the third direction is relatively smaller than a size extending in a first plane including the first direction and the third direction, and to have a long axis and a short axis in a third plane extending in the first direction and the second direction,
   the long axis is inclined with respect to the first direction,
   the beam director includes:
      a plurality of beam directing elements arranged in the third plane; and
      a beam directing region in which the plurality of beam directing elements arranged in the first direction are arranged in a predetermined number in the second direction,
   the beam directing region deflects the respective wavelength components toward the predetermined output port by independently phase-modulating the respective wavelength components, and
   the beam directing region is provided to correspond to the shape of the beam.

2. The wavelength selective switch according to claim 1, wherein the beam directing region is configured such that the plurality of beam directing elements arranged in the first direction forming a predetermined phase modulation pattern are plurally arranged in the second direction, and
   the beam directing region is provided to correspond to the shape of the beam by shifting the beam directing elements forming the predetermined phase modulation pattern in the second direction.

3. The wavelength selective switch according to claim 1, wherein, in the beam directing region, phase modulation amounts of the beam directing elements adjacent in the second direction are substantially equal.

4. The wavelength selective switch according to claim 1, wherein the long axis includes a first long axis and a second long axis that are inclined at different angles with respect to the first direction.

5. The wavelength selective switch according to claim 4, wherein the first long axis and the second long axis are inclined toward the same sides in the second direction with respect to the first direction.

6. The wavelength selective switch according to claim 1, wherein a shape of the beam incident on the beam director includes a distortion portion, and
   the distortion portion protrudes outward from ends of the short axis extending in the first direction.

7. The wavelength selective switch according to claim 1, wherein an optical axis of the beam incident on the wavelength dispersive element is inclined with respect to a normal of the wavelength dispersive element in the first plane.

8. The wavelength selective switch according to claim 1, wherein the input/output unit is configured to input or output a first beam having a first optical axis and a second beam having a second optical axis,
   the first optical axis and the second optical axis are inclined in the first direction at different angles with respect to the third direction,
   the wavelength dispersive element is provided in common between the first beam and the second beam,
   the beam director includes a first beam directing unit and a second beam directing unit,
   the first beam directing unit includes the plurality of beam directing regions and deflects the first beam toward the output port, and
   the second beam directing unit includes the plurality of beam directing regions and deflects the second beam toward the output port.

9. The wavelength selective switch according to claim 8, wherein the input/output unit includes
   a first input/output port including a first input port for inputting the first beam and a first output port for outputting the first beam; and a second input/output port including a second input port for inputting the second beam and a second output port for outputting the second beam, the first beam directing unit deflects the first beam toward the first output port, and the second beam directing unit deflects the second beam toward the second output port.

10. The wavelength selective switch according to claim 8, wherein the input/output unit includes a polarization diversity element that receives the beam input from the input port, separates the beam into the first beam and the second beam that are different polarization components, and emits the first beam and the second beam.

11. The wavelength selective switch according to claim 10, wherein the first beam directing unit and the second beam directing unit deflect the first beam and the second beam that are the same wavelength components and different polarization components toward a common output port.

12. The wavelength selective switch according to claim 8, wherein a positive or negative sign of the angle of inclination with respect to a normal of the wavelength dispersive element of the first optical axis and a positive or negative sign of the angle of inclination with respect to the normal of the wavelength dispersive element of the second optical axis differ from each other.

13. The wavelength selective switch according to claim 12, wherein an absolute value of the angle of inclination with respect to the normal of the first optical axis and an absolute value of the angle of inclination with respect to the normal of the second optical axis are substantially equal.

14. The wavelength selective switch according to claim 1, wherein the free space optical system includes:

an anamorphic system converting a shape of the beam input from the input port; and a condensing element condensing the wavelength component on the beam director, the anamorphic system converts the shape of the beam so that a size extending in the second plane is relatively greater than a size extending in the first plane, and the condensing element converts the shape of the beam incident on the beam director so that the size extending in the second plane is relatively smaller than the size extending in the first plane.

15. The wavelength selective switch according to claim 1, wherein an absolute value of the angle of inclination of the long axis is greater than 0° and equal to or less than 5°.

16. The wavelength selective switch according to claim 1, wherein an aspect ratio of the beam incident on the wavelength dispersive element, in the third plane, is equal to or greater than 10.

17. The wavelength selective switch according to claim 16, wherein the aspect ratio is equal to or greater than 40.

18. The wavelength selective switch according to claim 1, further comprising:

a first optical system matching a beam waist position, within the first plane, of the beam incident on the wavelength dispersive element to a position of the wavelength dispersive element in the third direction; and a second optical system shifting a beam waist position, within the second plane, of the beam incident on the wavelength dispersive element from the position of the wavelength dispersive element in the third direction.

19. A wavelength selective switch comprising:

an input/output unit including an input port for inputting a beam and an output port for outputting the beam arranged in a first direction;

a wavelength dispersive element dispersing the beam input from the input port into wavelength components along a second direction intersecting the first direction;

a beam director deflecting the wavelength component in the first direction to direct the wavelength component to the predetermined output port; and a free space optical system optically coupling the input/output unit, the wavelength dispersive element, and the beam director on a predetermined axis along a third direction intersecting the first direction and the second direction, wherein the free space optical system converts a shape of the beam incident on the beam director such that a size extending in a second plane including the second direction and the third direction is relatively smaller than a size extending in a first plane including the first direction and the third direction, and to have a long axis and a short axis in a third plane extending in the first direction and the second direction, and the long axis is inclined with respect to the first direction.

20. The wavelength selective switch according to claim 19, wherein the long axis includes a first long axis and a second long axis inclined at different angles with respect to the first direction.

* * * * *